(12) United States Patent
Hashizume et al.

(10) Patent No.: US 7,505,451 B2
(45) Date of Patent: Mar. 17, 2009

(54) USAGE-BASED CHARGING DEVICE AND USAGE-BASED CHARGING METHOD

(75) Inventors: Naoyoshi Hashizume, Chiba (JP); Hiroshi Tadano, Kanagawa (JP); Hirofumi Nakashima, Tokyo (JP); Yasuhiro Yamada, Chiba (JP)

(73) Assignee: Sony Corporation, Tokyo (JP)

( * ) Notice: Subject to any disclaimer, the term of this patent is extended or adjusted under 35 U.S.C. 154(b) by 1016 days.

(21) Appl. No.: 10/148,752

(22) PCT Filed: Oct. 5, 2001

(86) PCT No.: PCT/JP01/08807

§ 371 (c)(1),
(2), (4) Date: Jun. 3, 2002

(87) PCT Pub. No.: WO02/30048

PCT Pub. Date: Apr. 11, 2002

(65) Prior Publication Data

US 2002/0181447 A1 Dec. 5, 2002

(30) Foreign Application Priority Data

| Oct. 5, 2000 | (JP) | ............................. 2000-311731 |
| Oct. 5, 2000 | (JP) | ............................. 2000-311732 |
| Oct. 5, 2000 | (JP) | ............................. 2000-311733 |

(51) Int. Cl.
*H04L 12/66* (2006.01)
*H04M 1/64* (2006.01)
*G06F 17/00* (2006.01)

(52) U.S. Cl. ................ 370/352; 379/88.17; 705/52

(58) Field of Classification Search ...................... 379/114.01–115.03, 88.17; 370/392; 455/406, 455/407; 705/1; 709/224; 725/1
See application file for complete search history.

(56) References Cited

U.S. PATENT DOCUMENTS 5,065,393 A * 11/1991 Sibbitt et al. ................ 370/360

(Continued)

FOREIGN PATENT DOCUMENTS

CA 2228184 9/1998

(Continued)

*Primary Examiner*—Chi H Pham
*Assistant Examiner*—Warner Wong
(74) *Attorney, Agent, or Firm*—Finnegan, Henderson, Farabow, Garrett & Dunner, L.L.P.

(57) ABSTRACT

In a meter rate fees charging apparatus and method for charging a meter rate fee to a sender by amount of use of a network, it is designed such that charging processing means charges the sender based on zone information contained in transmission information communicated between the sender and the recipient. And, in a meter rate fees charging apparatus and method to charge each user a meter rate fee by amount of use of a network, it is designed such that charging means charges the recipient a meter rate fee obtained based on communication information only in the case where the sender is not prohibited from using the network. Furthermore, in a meter rate fees charging apparatus and method to charge a meter rate fee by amount of communication, it is designed such that, in the case where the personal information of the recipient and the personal information of the sender are both managed by the same supervisor, charging processing means selects one pair of the personal information of the recipient and the personal information of the sender out of the personal information of the recipient and the personal information of the sender obtained in duplication by a detecting means, and makes a charge.

19 Claims, 16 Drawing Sheets

U.S. PATENT DOCUMENTS

| | | | |
|---|---|---|---|
| 5,406,555 A | | 4/1995 | Yoshida |
| 5,867,494 A | * | 2/1999 | Krishnaswamy et al. ..... 370/352 |
| 5,960,416 A | * | 9/1999 | Block .......................... 705/34 |
| 5,978,456 A | * | 11/1999 | Takeuchi et al. ............. 379/131 |
| 6,069,890 A | * | 5/2000 | White et al. ................. 370/352 |
| 6,104,704 A | | 8/2000 | Buhler et al. |
| 6,240,091 B1 | * | 5/2001 | Ginzboorg et al. .......... 370/401 |
| 6,426,955 B1 | * | 7/2002 | Gossett Dalton et al. .... 370/401 |
| 6,785,233 B1 | * | 8/2004 | Goyal et al. ................. 370/231 |
| 6,798,770 B1 | * | 9/2004 | Hollatz et al. ................ 370/353 |
| 7,050,788 B2 | * | 5/2006 | DeLoach et al. ............ 455/406 |
| 7,103,032 B2 | * | 9/2006 | Kobayashi .................. 370/352 |
| 2001/0001000 A1 | * | 5/2001 | Thomas et al. .............. 370/200 |

FOREIGN PATENT DOCUMENTS

| | | |
|---|---|---|
| EP | 0 866 596 A2 | 9/1998 |
| JP | 4-284746 | 10/1992 |
| JP | 6-21942 | 1/1994 |
| JP | 10-303891 | 11/1998 |
| JP | 2000-507767 | 6/2000 |
| WO | WO 97/37462 | 10/1997 |

* cited by examiner

| AS NO. | ZONE |
|---|---|
| 2497 | JAPAN |
| 2498 | JAPAN |
| 2499 | JAPAN |
| 2500 | JAPAN |
| 2501 | JAPAN |
| 2502 | JAPAN |
| 2503 | JAPAN |
| 2504 | JAPAN |
| 2505 | JAPAN |
| 2506 | JAPAN |
| 2507 | JAPAN |

FIG. 2

192. 168. 10. 1
192. 168. xxx. xxx
192. 168. xxx. xxx
192. 168. xxx. xxx
192. 168. 20. 1
192. 168. xxx. xxx
.
.
.

FIG. 6

SOURCE 192.168.10.1|FORMAT A|AGGREGATION CallRecord|PERIOD 5|STARTTIME 112014691
1|ENDTIME 112281917|FLOWS 99|MISSED 0|RECORDS 70
192.168.1.102|192.168.10.10|1036|23|6|0|92|3812|3|7313366302|7313366569|22124
192.168.1.102|192.168.10.10|1036|23|6|0|67|8932|3|7313366302|7313366569|21680
192.168.1.102|192.168.10.10|1037|23|6|0|688|28144|2|7313366323|7313366562|213388
192.168.1.102|192.168.10.10|1037|23|6|0|441|22586|2|7313366323|7313366562|213136
192.168.1.101|192.168.10.10|1640|23|6|0|50|2249|2|7313366389|7313366462|54252
192.168.1.101|192.168.10.10|1640|23|6|0|91|3691|2|7313366389|7313366462|54652
192.168.1.101|192.168.10.10|1751|21|6|0|3|120|1|7313366610|7313366610|8
192.168.1.101|192.168.10.10|1751|21|6|0|3|157|1|7313366610|7313366610|4
192.168.1.101|192.168.10.10|1759|20|6|0|20|23351|1|7313366378|7313366379|252
192.168.1.101|192.168.10.10|1759|20|6|0|12|484|1|7313366378|7313366379|248
192.168.1.101|192.168.10.10|1758|21|6|0|11|787|1|7313366379|7313366379|320
192.168.1.101|192.168.10.10|1758|21|6|0|11|557|1|7313366379|7313366380|520
192.168.1.101|192.168.10.10|1760|20|6|0|407|162841|1|1079420|1|7313366492|7313366497|4836
192.168.1.101|192.168.10.10|1760|20|6|0|771|162841|1|1079420|1|7313366492|7313366497|4832
192.168.1.101|192.168.10.10|1761|20|6|0|424|169641|1|1079420|1|7313366497|7313366501|5012
192.168.1.101|192.168.10.10|1761|20|6|0|771|169641|1|1079420|1|7313366497|7313366501|5012
192.168.1.101|192.168.10.10|1762|20|6|0|422|168841|1|1079420|1|7313366501|7313366506|5028
192.168.1.101|192.168.10.10|1762|20|6|0|771|168841|1|1079420|1|7313366501|7313366506|5024
192.168.1.101|192.168.10.10|1763|6|0|771|1079420|1|7313366507|7313366512|4948

FIG. 7

| EDGE ROUTER | IP ADDRESSES IN EDGE ROUTER A | IP ADDRESSES IN EDGE ROUTER B | IP ADDRESSES IN EDGE ROUTER C | |
|---|---|---|---|---|
| IP ADDRESS | 192.168.1.1<br>172.168.1.2<br>172.168.1.3<br>⋮ | 172.168.2.1<br>192.168.2.2<br>192.168.2.3<br>⋮ | 192.168.3.1<br>172.168.3.2<br>10.168.3.3<br>⋮ | ・・・・ |

FIG. 11

| CASE | SOURCE | SINK | CONTENTS OF CHARGING PROCESSING |
|---|---|---|---|
| 1 | IN OWN EDGE ROUTER | IN OWN EDGE ROUTER | CHARGE SENDER AND RECIPIENT |
| 2 | IN OWN EDGE ROUTER | IN ANOTHER EDGE ROUTER | CHARGE SENDER AND RECIPIENT |
| 3 | IN OWN EDGE ROUTER | ANOTHER BUSINESS | CHARGE ONLY SENDER |
| 4 | IN ANOTHER EDGE ROUTER | IN OWN EDGE ROUTER | NO CHARGE |
| 5 | IN ANOTHER EDGE ROUTER | IN ANOTHER EDGE ROUTER | NO CHARGE |
| 6 | IN ANOTHER EDGE ROUTER | ANOTHER BUSINESS | NO CHARGE |
| 7 | ANOTHER BUSINESS | IN OWN EDGE ROUTER | CHARGE ONLY RECIPIENT |
| 8 | ANOTHER BUSINESS | IN ANOTHER EDGE ROUTER | NO CHARGE |

FIG. 12

USAGE-BASED CHARGING DEVICE AND USAGE-BASED CHARGING METHOD

TECHNICAL FIELD

The present invention relates to a meter rate fees charging apparatus and meter rate fees charging method, and is preferably applied to network connection service systems which offer Internet connection service and data transmitting/receiving service via network for example.

BACKGROUND ART

Until recently, there have been two methods for connecting a network communication terminal such as a personal computer, to a network such as the Internet: dial-up IP (Internet Protocol) connection and leased line IP constant-connection.

The dial-up IP connection is a method, in which an IP address is temporarily borrowed by dialing into the computer of a business (provider) offering network connection service and thereby an individual network communication terminal is connected to a network with the IP address, which is mainly used by personal users.

The leased line IP constant-connection is a method in which a network communication terminal is constantly connected through a leased line to an IP network owned by a provider whereby the network communication terminal is connected to the IP network or the Internet network via the IP network, using an individual and fixed IP address granted by the provider. This method has been utilized chiefly by businesses.

In recent years, with an increasing number of businesses which uses the Internet for communication with their branches and affiliated companies, the number of contracts with providers for this leased line IP connection has increased. Moreover, nowadays more individuals enjoy the IP constant-connection through leased lines thanks to the lowering prices of network facilities such as access lines and routers.

Accordingly, businesses and individuals can have their network communication terminals constantly connected to IP networks or the Internet for use by making a contract with providers for leased line IP connection.

There are two modes of charging fees for such leased line IP constant-connection: a flat rate system in which a fixed fee is paid to a provider regardless of how much network connection service is used, and a meter rate system in which a fee is paid to a provider in accordance with how much network connection service is used.

In the case of charging for leased line IP constant-connection, a provider actually charges only for the amount of use of their IP network by a network communication terminal under contract.

FIG. 17 illustrates an example of the configuration of a network connection system 2 run by the above provider 1. In this network connection system 2 the Internet 5 is connected with a leased line 4 to an IP network 3 owned by the provider 1.

Also, a plurality of edge routers $6_1$-$6_n$ are connected to the IP network 3, and each of the edge routers $6_1$-$6_n$ is connected with wired or wireless leased lines $7_{11}$-$7_{1n}$, ..., $7_{n1}$-$7_{nn}$ to corresponding routers $9_{11}$-$9_{1n}$, ..., $9_{n1}$-$9_{nn}$ of users $8_{11}$-$8_{1n}$, ..., $8_{n1}$-$8_{nn}$ each granted a personal and fixed IP address by making a contract with the provider 1 for leased line IP connection.

Furthermore, each router $9_{11}$-$9_{1n}$, ..., $9_{n1}$-$9_{nn}$ is connected to a network communication terminal $11_{11}$-$11_{1n}$, ..., $11_{n1}$-$11_{nn}$ such as a personal computer, with a communication line $10_{11}$-$10_{1n}$, ..., $10_{n1}$-$10_{nn}$ such as an in-house LAN, for example, of each user $8_{11}$-$8_{1n}$, ..., $8_{n1}$-$8_{nn}$.

Thereby, in the network connection service system 2 it is designed such that each user $8_{11}$-$8_{1n}$, ..., $8_{n1}$-$8_{nn}$ can connect his own network communication terminal $11_{11}$-$11_{1n}$, ..., $11_{n1}$-$11_{nn}$ to the IP network 3 or the Internet 5 via the router $9_{11}$-$9_{1n}$, ..., $9_{n1}$-$9_{nn}$, the leased line $7_{11}$-$7_{1n}$, ..., $7_{n1}$-$7_{nn}$, and the edge router $6_1$-$6_n$, using the IP address granted by the provider 1, for communication with other users $8_{11}$-$8_{1n}$, ..., $8_{n1}$-$8_{nn}$ and for a variety of other purposes.

Also, the provider 1 is equipped with an charging center 12 which charges each user $8_{11}$-$8_{1n}$, ..., $8_{n1}$-$8_{nn}$ a meter-rate fee for such communication. When a network communication terminal $11_{11}$-$11_{1n}$, ..., $11_{n1}$-$11_{nn}$ subject to charging communicates with another network communication terminal $11_{11}$-$11_{1n}$, ..., $11_{n1}$-$11_{nn}$, the charging center 12 is designed to be capable of charging the user $8_{11}$-$8_{1n}$, ..., $8_{n1}$-$8_{nn}$ by amount of communication or amount of communication time of a flow (a series of packets) passing through the edge routers $6_1$-$6_n$ connected with the network communication terminals $11_{11}$-$11_{1n}$, $11_{n1}$-$11_{nn}$ subject to charging.

In practice, in the charging center 12, when charging is made in accordance with the communication amount of a flow, a meter rate fee for the flow passing through an edge router $6_1$-$6_n$ is charged to the users $8_{11}$-$8_{1n}$, ..., $8_{n1}$-$8_{nn}$ having a source IP address and a sink IP address based on the source IP address and the sink IP address included in the flow.

Then, in the case where communication is made between a user $8_{11}$-$8_{1n}$, ..., $8_{n1}$-$8_{nn}$ having a contract with the provider 1 having the charging center 12 and a user 13 having a contract with another provider, the charging center 12 makes no-charge with respect to a source IP address and a sink IP address of the user 13 because no contract is made between the user 13 and the provider 1.

Also, since the charging center 12 is designed to perform charging based on each of a source IP address and a sink IP address, if the flow is sent by such user 13, no charging is made to the user 13 (with respect to the source IP address), but charging is certainly made to the user $8_{11}$-$8_{1n}$, ..., $8_{n1}$-$8_{nn}$ (with respect to the sink IP address). On the other hand, when a flow is sent to the user 13, no charging is made to the user 13 (with respect to the sink IP address), but charging is surely made to the user $8_{11}$-$8_{1n}$, ..., $8_{n1}$-$8_{nn}$ (with respect to the source IP address).

In this manner, in the network connection service system 2, charging is made with respect to each of a source IP address and a sink IP address, thus avoiding missing charging to contracted users $8_{11}$-$8_{1n}$, ..., $8_{n1}$-$8_{nn}$.

In such a conventional network connection service system 2, however, in the case where a user $8_{11}$-$8_{1n}$, ..., $8_{n1}$-$8_{nn}$ communicates with a user 13 having a contract with another provider, as described above, since the charging center 12 charges a meter rate for a flow of communication only to the user $8_{11}$-$8_{1n}$, ..., $8_{n1}$-$8_{nn}$ having a contract with its own provider 1, the same meter rate fee is charged to the user $8_{11}$-$8_{1n}$, ..., $8_{n1}$-$8_{nn}$ regardless of whether the other user 13 as a communication partner is abroad, which has posed a problem that it is hard to provide service offering a lower rate if a communication partner is in the same country and a higher rate if a communication partner is in another country, as practiced in the telephone service for example.

Also, in a conventional network connection service system 2, in such a case that a network communication terminal 13A of a user 13 having a contract with another provider performs one-way transmission of flows with a malign intention, to a network communication terminal $11_{11}$-$11_{1n}$, ..., $11_{n1}$-$11_{nn}$, via the Internet 5, the IP network 3, and an edge routers $\mathbf{6}_1$-$\mathbf{6}_n$ in succession, charging is made for these flows because the flows pass through an edge router $\mathbf{6}_1$-$\mathbf{6}_n$, which has caused a problem that charging is made to the user $\mathbf{8}_{11}$-$\mathbf{8}_{1n}$, ..., $\mathbf{8}_{n1}$-$\mathbf{8}_{nn}$ for such communication even though the user $\mathbf{8}_{11}$-$\mathbf{8}_{1n}$, ..., $\mathbf{8}_{n1}$-$\mathbf{8}_{nn}$ does not want to communicate with the network communication terminal 13A.

Further, in the network connection service system 2, even if the user $\mathbf{8}_{11}$-$\mathbf{8}_{1n}$, ..., $\mathbf{8}_{n1}$-$\mathbf{8}_{nn}$ uses a fire wall to reject malignant access from such network communication terminal 13A and thereby to destroy the flows by the access, the flows have passed through the edge router $\mathbf{6}_1$-$\mathbf{6}_n$ connected to the user $\mathbf{8}_{11}$-$\mathbf{8}_{1n}$, ..., $\mathbf{8}_{n1}$-$\mathbf{8}_{nn}$, so charging is made due to this information. Consequently, there still remains a problem that charging is made to the user $\mathbf{8}_{11}$-$\mathbf{8}_{1n}$, ..., $\mathbf{8}_{n1}$-$\mathbf{8}_{nn}$ for the unwanted communication even though the user $\mathbf{8}_{11}$-$\mathbf{8}_{1n}$, ..., $\mathbf{8}_{n1}$-$\mathbf{8}_{nn}$ does not want to communicate with the network communication terminal 13A.

Still further, in the conventional network connection service system 2, in the case where two users $\mathbf{8}_{11}$-$\mathbf{8}_{1n}$, ..., $\mathbf{8}_{n1}$-$\mathbf{8}_{nn}$ each having a contract with the same provider 1 communicate with each other, because flows exchanged between the two users $\mathbf{8}_{11}$-$\mathbf{8}_{1n}$, ..., $\mathbf{8}_{n1}$-$\mathbf{8}_{nn}$ pass through a first edge router $\mathbf{6}_1$-$\mathbf{6}_n$ connected to one user $\mathbf{8}_{11}$-$\mathbf{8}_{1n}$, ..., $\mathbf{8}_{n1}$-$\mathbf{8}_{nn}$ and a second edge router $\mathbf{6}_1$-$\mathbf{6}_n$ connected to the other user $\mathbf{8}_{11}$-$\mathbf{8}_{1n}$, ..., $\mathbf{8}_{n1}$-$\mathbf{8}_{nn}$, charging is to be made to both users $\mathbf{8}_{11}$-$\mathbf{8}_{1n}$, ..., $\mathbf{8}_{n1}$-$\mathbf{8}_{nn}$ based on the flows passing through the first edge router $\mathbf{6}_1$-$\mathbf{6}_n$, and yet charging is again made to both users $\mathbf{8}_{11}$-$\mathbf{8}_{1n}$, ..., $\mathbf{8}_{n1}$-$\mathbf{8}_{nn}$ based on the flows passing through the second edge router $\mathbf{6}_1$-$\mathbf{6}_n$, which has caused a problem that charging is made twice to both users $\mathbf{8}_{11}$-$\mathbf{8}_{1n}$, ..., $\mathbf{8}_{n1}$-$\mathbf{8}_{nn}$ for the same flow passing through the IP network 3 (this is referred to as "double charging" hereinafter).

DESCRIPTION OF THE INVENTION

The present invention has been made considering the above points, and is intended to propose a meter rate fees charging apparatus and meter rate fees charging method capable of 1) improving service, 2) offering higher reliability in charging by avoiding charging for undesired communication, and 3) preventing unclear charges to users by getting rid of double charges.

To solve the subject matters, in the present invention the meter rate fees charging apparatus which charges a meter rate fee to a sender in accordance with the amount of use of network, comprises: a receiving means for receiving information transmitted to a recipient via a network, the information being transmission information composed of communication information including the personal information of the sender and the personal information of the recipient and zone information denoting a zone where the sender is; a detecting means for detecting the personal information and the zone information of the sender in the transmission information; and a charging processing means for charging a meter rate fee to the sender detected by the detecting means. The charging processing means is capable of performing charging to the sender based on the zone information, whereby a meter rate fee may be changed according to a distance between the source and the sink, thus making it possible to realize a meter rate fees charging apparatus offering improved service.

Also, in the present invention, a meter rate fees charging method by which a meter rate fee is charged to a sender in accordance with the amount of use of a network, comprises: the first step of receiving information transmitted to a recipient via a network, the information being transmission information composed of communication information including the personal information of the sender and the personal information of the recipient and zone information denoting a zone where the sender is; the second step of detecting the personal information and the zone information of the sender in the transmission information; and the third step of charging a meter rate fee to the sender detected at the second step. At the third step, charging can be made based on the zone information, whereby a meter rate fee may be changed according to a distance between the source and the sink, thus making it possible to realize a meter rate fees charging method capable of offering improved service.

Furthermore, in the present invention a meter rate fees charging apparatus which charges each user a meter rate fee in accordance with the amount of use of network between a sender and a recipient, comprises: a collecting means for collecting information on the sender and recipient from transmission information transmitted from the sender to recipient via a network and specific communication information needed for charging processing; and a charging means for charging a meter rate fee calculated based on the communication information to the recipient of the communication information collected by the collecting means. The charging means charges the recipient the meter rate fee obtained based on the communication information only when the sender of the transmission information is not prohibited from using the network, thereby preventing user-dissented charges, which in turn helps realize a meter rate fees charging apparatus having higher reliability in charging.

Still further, in the present invention a meter rate fees charging method by which a meter rate fee is charged to each user in accordance with the amount of use of network between a sender and a recipient, comprises: the first step of collecting information on the recipient and sender of transmission information transmitted from the sender to the recipient via a network and specific communication information needed for charging processing; and the second step of charging the recipient a meter rate fee calculated based on the communication information only when the sender of the transmission information is not prohibited from using the network, thereby preventing user-dissented charges, which helps realize a meter rate fees charging method having higher reliability in charging.

Still further, in the present invention, a meter rate fees charging apparatus which charges a meter rate fee to a sender and a recipient in accordance with the amount of communication transmitted from the sender to the recipient via a network, comprises: a detecting means for detecting the personal information of the sender and the personal information of the recipient in transmission information transmitted and received via the network; and a charging processing means for charging a meter rate fee based on the personal information of the sender and the personal information of the recipient detected by the detecting means. In the case where the personal information of the recipient and the personal information of the sender are both managed by the same supervisor, the charging processing means is to make a charge based on only one pair of the personal information of the recipient and the personal information of the sender chosen out of the personal information of the recipient and the personal information of the sender obtained in duplication by the detecting means, thereby preventing a double charge for the meter rate fee, which in turn helps realize a meter rate fees charging apparatus capable of avoiding charging unclear fees to users.

Still further, in the present invention, a meter rate fee charging method by which a meter rate fee is charged to a sender and a recipient in accordance with the amount of communication transmitted from the sender to the recipient via a network, comprises: the first step of detecting the personal information of the sender and the personal information of the recipient in transmission information transmitted/received via network; and the second step of making a charge based on only one pair of the personal information of the recipient and the personal information of the sender chosen out of the personal information of the recipient and the personal information of the source obtained in duplication at the first step in the case where both the personal information of the recipient and the personal information of the sender are managed by the same supervisor. Thereby, double charges for the meter rate fee can be prevented, which in turn helps realize a meter rate fees charging method capable of avoiding charging unclear fees to users.

BRIEF DESCRIPTION OF DRAWINGS

FIG. 2 is a schematic diagram used in explaining a domestic AS table.

FIG. 6 is a schematic diagram used in explaining a packet filter rule.

FIG. 7 is a schematic diagram used in explaining the contents of flow information.

FIG. 11 is a schematic diagram used in explaining an IP address table.

FIG. 12 is a schematic diagram used in explaining a charging matrix table.

BEST MODE OF CARRYING OUT THE INVENTION

Figure 1:
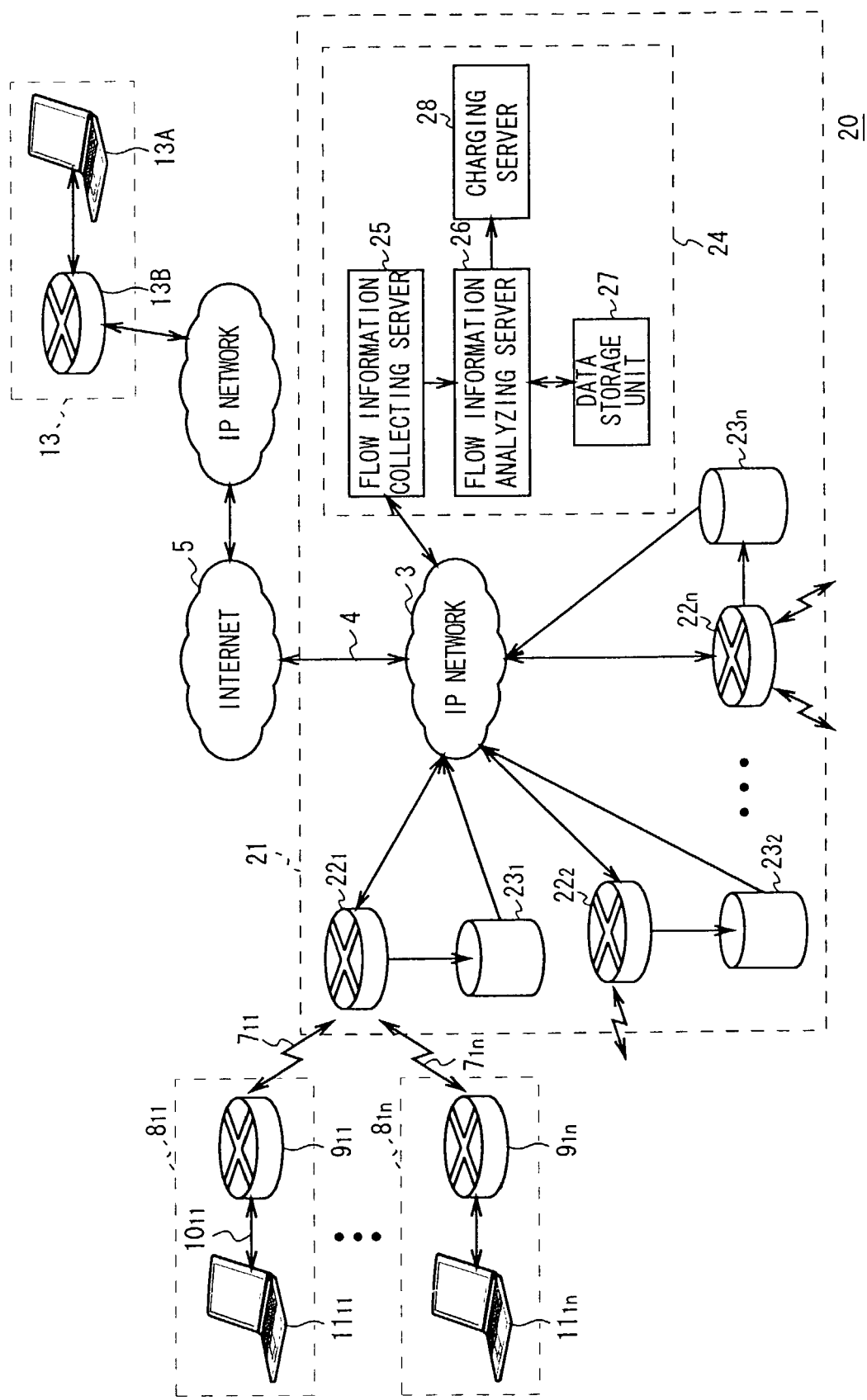
FIG. 1 is a block diagram showing the configuration of a network connection service system in the first embodiment.

One mode of carrying out the present invention is described in detail referring to the drawings attached.

Figure 17:
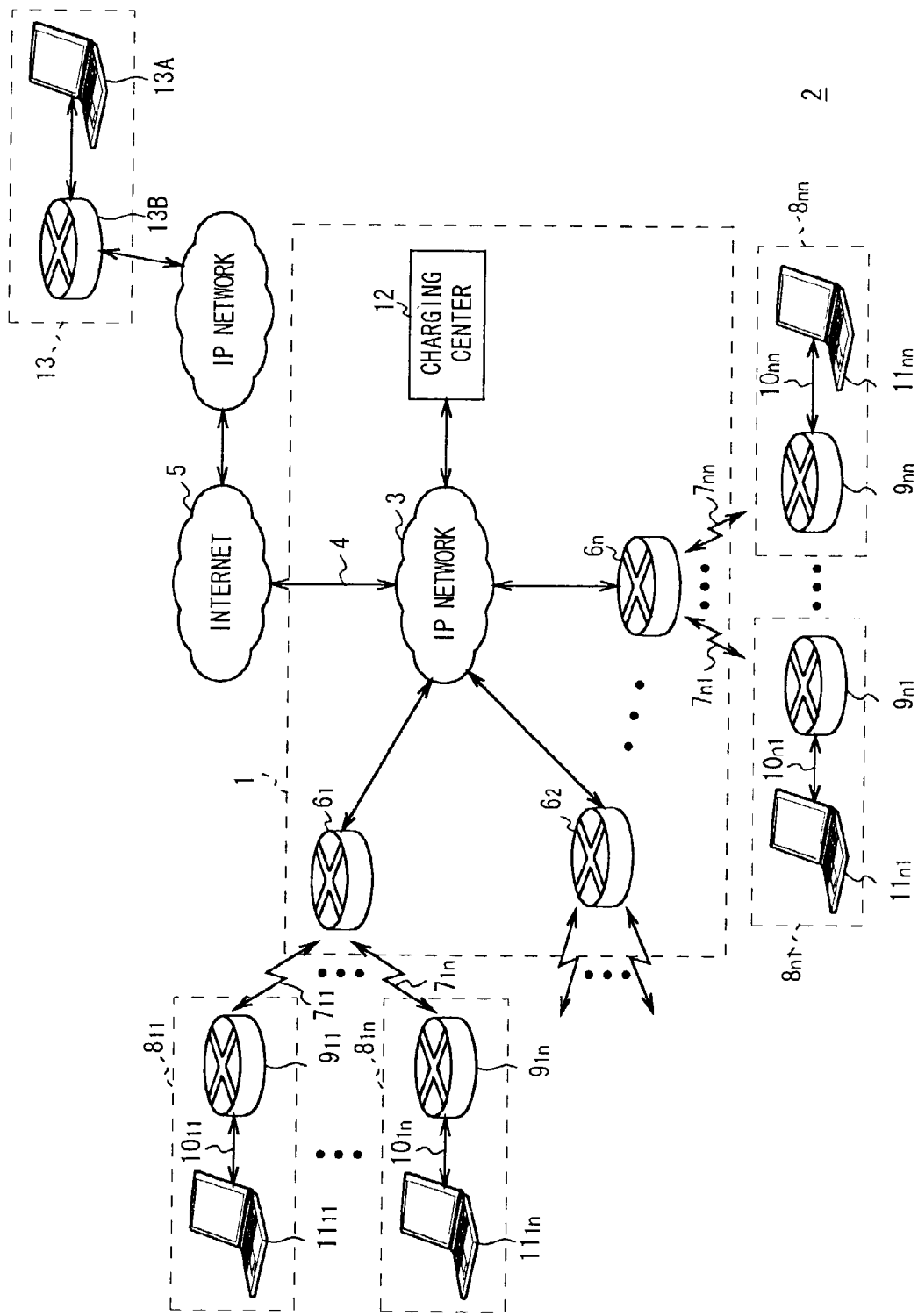
FIG. 17 is a block diagram showing the configuration of a conventional network connection service system.

(1) First Embodiment (1-1) Configuration of Network Connection Service System in First Embodiment In FIG. 1 where the same reference numerals are applied to parts corresponding to those of FIG. 17, reference numeral 20 shows an Internet connection service system of this embodiment as a whole, wherein an IP network 3 owned by a provider 21 is connected to the Internet 5 with a leased line 4.

Also, the IP network 3 is connected to a plurality of edge routers $22_1$-$22_n$, each of which is connected with wired or wireless leased lines $7_{11}$-$7_{1n}$ to routers $9_{11}$-$9_{1n}$ of users $8_{11}$-$8_{1n}$ each having a private and fixed IP address granted by making a contract with the provider 21 for leased line IP connection.

Moreover, the routers $9_{11}$-$9_{1n}$ are connected to network communication terminals $11_{11}$-$11_{1n}$ such as personal computers, with communication lines $10_{11}$-$10_{1n}$, for example, an in-house LAN of the users $8_{11}$-$8_{1n}$, respectively.

Thereby, in the network connection service system 20 each user $8_{11}$-$8_{1n}$ can connect his network communication terminal $11_{11}$-$11_{1n}$ to the Internet 5 via the router $9_{11}$-$9_{1n}$, the leased line $7_{11}$-$7_{1n}$, the edge router $22_1$-$22_n$, and the IP network 3, with the IP address granted by the provider 21.

Meanwhile, when any user $8_{11}$-$8_{1n}$ connected to the router $9_{11}$-$9_{1n}$ establishes communication via the IP network 3 and thereby, a flow (a series of packets) as communication data passes through the edge router $22_1$-$22_n$, the edge router $22_1$-$22_n$ detects the source IP address and the sink IP address, etc., in the header data, etc., of the flow, and the number of bytes of the passed flow.

Then, the edge router $22_1$-$22_n$ collectively outputs information thus obtained (this is referred to as "flow information" en masse hereinafter) on a plurality of flows, to the corresponding flow information storage unit $23_1$-$23_n$ connected to the edge router $22_1$-$22_n$, at a given interval as a file in a prescribed format, which is stored in the flow information storage unit $23_1$-$23_n$.

In this case, the flow information includes information on "source IP address", "sink IP address", "source port number", "sink port number", "protocol type (TCP etc.), "type of service (TOS)", "number of packets", "number of bytes", "number of flows", "amount of communication bytes", "time stamp of header packet", "time stamp of last packet", "source AS (Autonomous System) number", and "sink AS number".

Note that the AS number is an identification number assigned to each group of routers sharing a consistent policy under the same control. That is, the Internet 5 is made up of a plurality of IP networks linked each other, owned by organizations such as providers, colleges, and businesses. Each of such organizations having an IP network has an identification number called AS number, and it is designed such that they identify each other in communication among themselves using their AS numbers.

For additional information, by providing probes at desired points over the IP network 3, the flow information can be obtained from such points, too.

The flow information on each flow stored in each flow information storage unit $23_1$-$23_n$ as described above is collected into a flow information collecting server 25.

Next, with collecting processing performed on the collected flow information, the flow information collecting server 25 selects information for charging, needed for charging processing described later, such as "source IP address", "sink IP address", "amount of communication bytes", "source AS number", and "sink AS number", deletes the unselected flow information, and then transmits the information for charging to a flow information analyzing server 26.

Subsequently, the flow information analyzing server 26 analyzes the information for charging received, to specify the zones of the server and the sender of the flow.

In analyzing such information for charging, the flow information analyzing server 26 uses a domestic AS table shown in FIG. 2, retained in a data storage unit 27 composed of a hard disk or the like. This domestic AS table (FIG. 2) lists the AS numbers used in Japan.

In specifying the zones of the sink and the source of each flow, the flow information analyzing server 26 refers to the domestic AS table to confirm for each flow whether there exist the source AS number and the sink AS number on the domestic AS table, and when it is confirmed that there do, the sender or the recipient is specified to be in the same country, while when it is not confirmed, the sender or the recipient is specified to be abroad. Subsequently, the flow information analyzing server 26 transmits the information for charging to a charging server 28.

Then, the charging server 28 specifies the users $8_{11}$-$8_{1n}$ to be charged a meter rate fee for the flow based on the source IP address and the sink IP address.

Subsequently, the charging server 28 calculates a meter rate fee for the flow (namely, the amount of communication bytes) by communication by reference to a domestic rate table or an international rate table, not shown in figure, according to the results specified by the flow information analyzing server 26, and charges the meter rate fee calculated to the specified users $8_{11}$-$8_{1n}$.

Note that the charging server 28 calculates a meter rate fee in accordance with the amount of communicated bytes, for example, at ¥10 per 1 [Kbyte] for domestic communication, and at ¥20 per 1 [Kbyte] for international communication.

Then, the charging server 28 performs such processing as adding up a fee for each flow on the basis of meter rates for each user $8_{11}$-$8_{1n}$ having a contract for the meter rate system, and debiting, for example, the total fee of one month as the charge of that month, from the bank account of each user $8_{11}$-$8_{1n}$, and issuing a receipt.

In this manner, in the network connection service system 20 it is designed such that meter rates may be changed depending on whether the sender or the recipient of a flow is abroad.

(1-2) Configuration of Flow Information Analyzing Server 26

Figure 3:
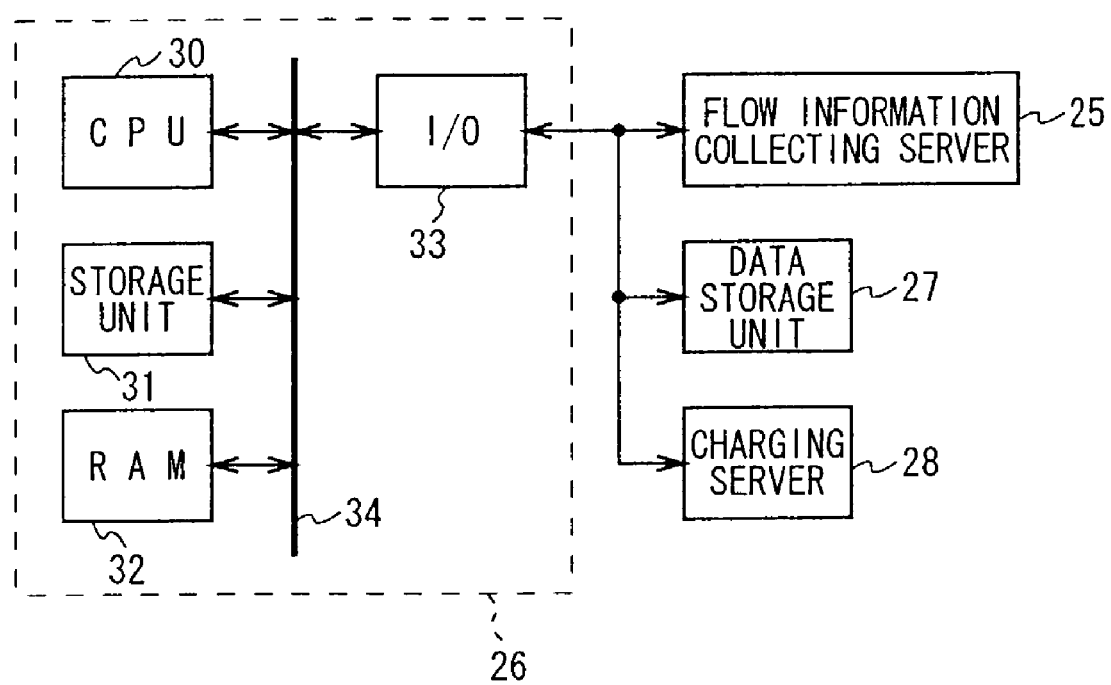
FIG. 3 is a block diagram showing the configuration of a flow information analyzing server.

The configuration of the flow information analyzing server 26 is shown in FIG. 3. As is apparent from FIG. 3, the flow information analyzing server 26 comprises a CPU (Central Processing Unit) 30, a storage unit 31 composed of a hard disk drive or the like, storing various programs, a RAM (Random Access Memory) 32 as a work memory for the CPU 30, and an input/output (I/O) unit 33 functioning as an interface for communication with the flow information collecting server 25, the data storage unit 27 or the charging server 28, all the four components connected to each other with a bus 34.

Figure 4:
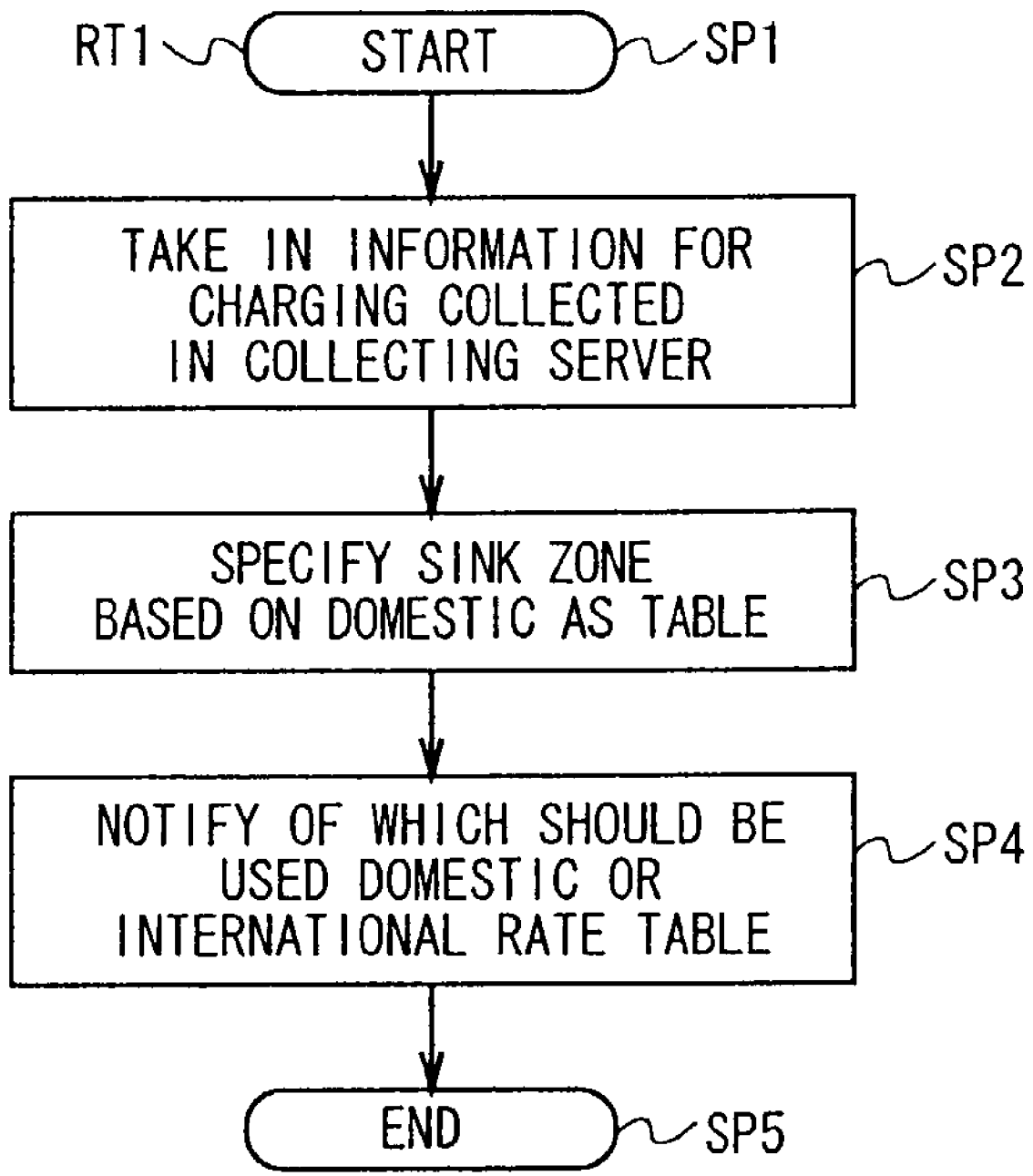
FIG. 4 is a flowchart showing a charging processing procedure.

The CPU 30 can change meter rates depending upon whether the sender or the recipient of a flow is abroad, by executing a charging processing procedure RT1 shown in FIG. 4 in accordance with the programs stored in the storage unit 31.

Specifically, after the charging processing procedure RT1 starts at step SP1 with flow information collected into the flow information collecting server 25, the CPU 30 takes in information for charging collected in the flow information collecting server 25 by communicating with the flow information collecting server 25 via the I/O unit 33 at step SP2.

Subsequently, the CPU 30 proceeds to step SP3 and specifies the source AS number and the sink AS number of the flow from the information for charging obtained at step SP2.

Then the CPU 30 communicates with the data storage unit 27 via the I/O unit 33 to find out whether there exist the source AS number and the sink AS number on the domestic AS table (FIG. 2) stored in the data storage unit 27, thus confirming whether the sender and the recipient of the flow are at home or abroad.

Next, the CPU 30 proceeds to step SP5 and notifies the charging server 28 of which should be used, a domestic rate table or an international rate table, on the basis of the results confirmed at step SP4, and then terminates the charging processing procedure RT1 at step SP6.

As described above, the flow information analyzing server 26 can change meter rates for the flow depending on whether the sender or the recipient is at home or abroad.

(1-3) Operations and Effects of this Embodiment

In the above configuration, in this network communication service system 20, the source IP address, source AS number, sink IP address and sink AS number of a flow are detected based on the flow passing through an edge router $22_1$-$22_n$, and confirmation is made on whether the detected source AS number and sink AS number exist on the domestic AS table, and if the source AS number and sink AS number are both found on the domestic AS table, a meter rate fee is calculated based on the domestic rate table, while using the international rate table to calculate the meter rate fee when one or both of the source AS number and the sink AS number do not exist on the domestic AS table. In this way, the meter rate fee thus calculated is charged to the users using the source IP address and the sink IP address, as needed.

Therefore, according to this network connection service system 20, it is possible to change meter rates based on a source AS number and a sink AS number between the domestic rate table offering lower meter rates and the international rate table offering higher meter rates, depending on whether the sender or recipient of a flow is abroad or on whether the recipient and the sender of the flow are at home.

According to the above configuration, with the source IP address, source AS number, sink IP address and sink AS number of a flow detected based on the flow passing through an edge router $22_1$-$22_n$, confirmation is made on whether the detected source AS number and sink AS number exist on the domestic AS table, and when the source AS number and sink AS number are both found on the domestic AS table, a meter rate fee is calculated based on the domestic rate table, while using the international rate table to calculate the meter fee when one or both of the source AS number and the sink AS number do not exist on the domestic AS table, whereby the meter rate fee is charged to the users having the source IP address and the sink IP address, as needed. As a result, mater rates can be changed by differences between the domestic and international rates, thus realizing a network connection service system offering improved service.

(1-4) Other Embodiments

In the foregoing embodiment, explanation is given on the case where confirmation is made on whether the sender or the recipient is at home or abroad by confirming whether the source AS number and the sink AS number are found on the domestic AS table. The present invention, however, is not limited to it, and the zones where the sender and the recipient are may be ascertained by confirming the zones having the source AS number and the sink AS number with a zone AS table showing not only the domestic AS numbers but the overseas AS numbers.

In this case, it is possible to charge users $8_{11}$-$8_{1n}$ for a meter rate calculated more minutely by zone, by calculating a meter rate based on a relationship between the zones ascertained.

Also, in the foregoing embodiment, explanation is given on the case where the flow information collecting server 25, the flow information analyzing server 26, and the charging server 27 provided discretely perform different processing for charging, however, the present invention is not limited to it, and the charging processing may be performed by a single server which can execute those processing.

Furthermore, in the foregoing embodiment, explanation is given on the case where a meter rate fee is calculated in accordance with the amount of communication of a flow, however, the present invention is not limited to it, and a meter rate fee may be calculated by amount of communication time spent for a flow.

Still further, in the foregoing embodiment, explanation is given on the case where AS numbers are used as zone information, however, the present invention is not limited to it, and zone information may be one directly related to a zone itself such as Japan or USA, or geographical information such as latitude and longitude.

Still further, in the foregoing embodiment, explanation is given on the case where a personal computer is used as a transmitting means for adding zone information to transmission data and transmitting the resultant, however, the present invention is not limited to it, and a router, and a server, etc., retaining zone information may be used.

Still further, in the foregoing embodiment, explanation is given on the case where a detecting means and a charging processing means are performed by different servers, however, the present invention is not limited to it, and the detecting means and the charging processing means may be performed by the same server.

Still further, in the foregoing embodiment, explanation is given on the case where the present invention is applied to a network connection service system 20 capable of establishing communication via the Internet 5, however, the present invention is not limited to it, and can also be applied widely to meter rate posting systems to calculate meter rate fees for networks such as LANs (Local Area Network) and telephone circuits, other than the Internet.

Still further, in the foregoing embodiment, explanation is given on the case where the domestic AS table for Japan shown in FIG. 2, is employed as an AS table, however, the present invention is not limited to it, and AS tables pertaining to other countries or zones may be used, for example, an AS table for the USA (United States of America).

Figure 5:
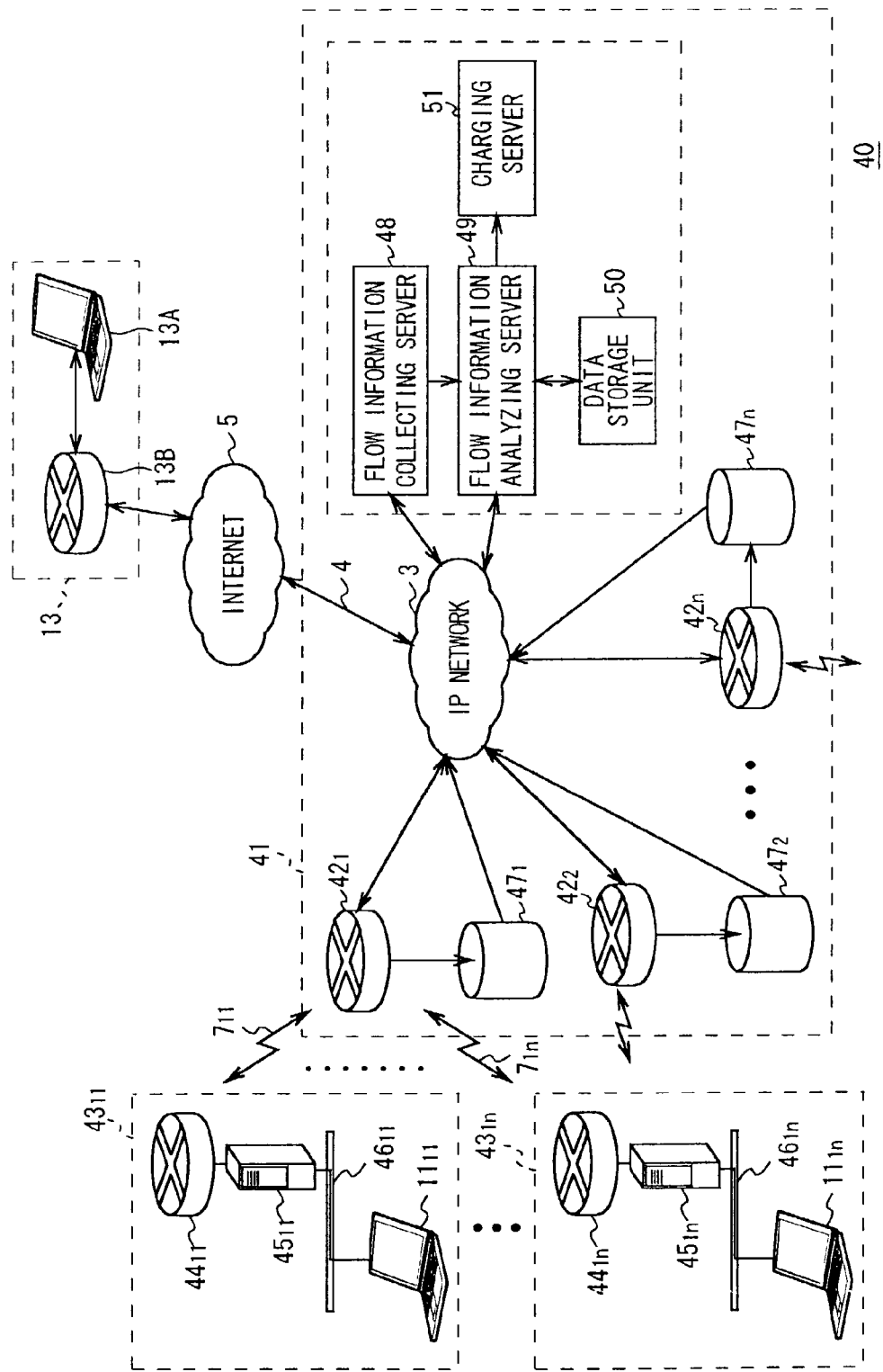
FIG. 5 is a block diagram showing the configuration of a network connection service system in the second embodiment.

(2) Second Embodiment (2-1) Configuration of Network Connection Service System in Second Embodiment In FIG. 5 where the same reference numerals are applied to parts corresponding to those of FIG. 17, reference numeral 40 shows a network connection service system of this embodiment as a whole, wherein an IP network 3 owned by a provider 41 is connected to the Internet 5 with a leased line 4.

Also, the IP network 3 is connected with a plurality of edge routers $42_1$-$42_n$, each of which is connected with wired or wireless leased lines $7_1$-$7_n$ to CPE (Customer Premise Equipment) routers $44_{11}$-$44_{1n}$ of users $43_{11}$-$43_{1n}$ each granted a personal and fixed IP address by making a contract with the provider 41 for leased line IP connection.

Moreover, each of the CPE router $44_{11}$-$44_{1n}$ is connected to a network communication terminal $11_{11}$-$11_{1n}$, such as a personal computer, via a fire wall server $45_{11}$-$45_{1n}$ for limiting access from the outside and a communication line $46_{11}$-$46_1$ such as an in-house LAN.

Therefore, in the network connection service system 40 each user $43_{11}$-$43_{1n}$ may connect his network communication terminal $11_{11}$-$11_{1n}$ with the Internet 5 via the CPE router $44_{11}$-$44_{1n}$, leased line $7_{11}$-$7_{1n}$, edge router $42_1$-$42_n$, and IP network 3, with the IP address granted by the provider 41, to use the Internet 5.

Also, the fire wall server $45_{11}$-$45_{1n}$ is set up with information transmitted as a result of access from the outside, namely a table (this is referred to as "packet filter rule" hereinafter) listing the IP addresses of network communication terminals 13A (this address is particularly referred to as "set-up IP address" hereinafter) from which packets are allowed to pass.

Upon receipt of packets by communicating with a network communication terminal $11_{11}$-$11_{1n}$, a fire wall server $45_{11}$-$45_{1n}$ detects the IP address included in the header of the packets, and if the detected IP address is other than those listed in the packet filter rule, the packets with this IP address is destroyed.

For additional information, if packets are destroyed, the fire wall server $45_{11}$-$45_{1n}$ retains as a log the source IP address, and the sink IP address, etc., of the packets.

The CPE router $44_{11}$-$44_{1n}$ is designed to be capable of having an access limiting function, like the fire wall server $45_{11}$-$45_{1n}$ set up with the packet filter rule.

As a result, a user $43_{11}$-$43_{1n}$ can communicate only with network communication terminals $11_{11}$-$11_{1n}$ which are allowed to access, by preparing a fire wall server $45_{11}$-$45_{1n}$.

Meanwhile, when any user $43_{11}$-$43_{1n}$ connected with the CPE router $44_{11}$-$44_{1n}$ makes communication via the IP network 3 and thereby a flow (a series of packets) passes through an edge router $42_1$-$42_n$ as communication data, the edge router $42_1$-$42_n$ detects the source IP address and the sink IP address, etc., in the header data etc., of the flow, and the number of bytes of the passed flow.

Then each edge router $42_1$-$22_n$ collectively outputs information (this is referred to as "flow information" en masse hereinafter) thus obtained on a plurality of flows, to the corresponding flow information storage unit $47^1$-$47_n$ connected to the edge router $42_1$-$42_n$ as a file in a format as shown in FIG. 7, for example, in order to store them in the flow information storage unit $47_1$-$47_n$.

In FIG. 7, the first two lines denote a header, and each of the following lines represents the flow information of each flow. In this example information of the following items is stored as flow information in the order of: "source IP address", "sink IP address", "source port number", "sink port number", "protocol type (TCP etc.), "type of service (TOS)", "number of packets", "number of bytes", "number of flows", "time stamp of header packet", "time stamp of last packet", and "time spent for the passage of a flow".

The flow information on each flow thus stored in each flow information storage unit $47_1$-$47_n$ is subsequently collected in a flow information collecting server 48 via the IP network 3. Then a flow information analyzing server 49 analyzes the flow information accumulated in the flow information collecting server 48, to judge based on the analysis results whether charging should be made for each flow.

At this stage, in analyzing such flow information, the flow information analyzing server 49 lets a date storage unit 50 composed of a hard disk drive or the like, retain the same packet filter rules as the packet filter rules (FIG. 6) stored in the fire wall servers $45_{11}$-$45_{1n}$ provided on the user $43_{11}$-$43_{1n}$ sides, in order to use the retained packet filter rules.

That is, the network connection service system 40 is designed such that each fire wall server $45_{11}$-$45_{1n}$ of the user $43_{11}$-$43_{1n}$ transmits the packet filter rule to the flow information analyzing server 49 periodically, once in a few minutes for example, to update the packet filter rule retained in the data storage unit 50 (this event is referred to as "synchronization" hereinafter), so that each fire wall server $45_{11}$-$45_{1n}$ and the flow information analyzing server 49 can always use the same packet filter rule.

And, in analyzing each flow the flow information analyzing server 49, referring to the packet filter rule to designate packets of which access is rejected, confirms for each flow whether or not the source IP address is any of the set-up IP addresses listed in the packet filter rule (that is, to confirm whether the flow is from a network communication terminal which is allowed to access).

Subsequently, when it is ascertained that the flow is from a network communication terminal having an IP address other than the set-up IP addresses listed in the packet filter rule, like a malign network communication terminal (this is referred to as "illegitimate network communication terminal" hereinafter) from which access should be rejected for example, the flow information analyzing server 49 determines that charging should not be made for this flow.

On the other hand, when it is ascertained that the flow is from a network communication terminal having the same IP address as any of the set-up IP addresses listed in the packet filter rule, like a network communication terminal which is allowed to access (this is referred to as "legitimate network communication terminal" hereinafter), the flow information analyzing server 49 determines that charging should be made for this flow.

Consequently, based on the decision made above, the flow information analyzing server 49 outputs the flow information of each flow for which charging should be made, to a charging server 51.

The charging server 51 calculates a meter rate fee for each flow by communication, based on the flow information given from the flow information analyzing server 49 and a preset rate table not shown in figure.

In practice, the charging server 51 is designed to calculate a meter rate fee for each flow by "number of packets", and "the number of bytes", etc., of the flow information, that is, by amount of communication of the flow. In the case of calculating a meter rate fee for each flow by "time spent for the passage of a flow" etc., the charging server 51 may calculate a meter rate fee for each flow by amount of communication time of each flow.

In charging the meter rate fee thus calculated, the charging server 51 detects the source IP address and the sink IP address in the flow information, and in the case that the source IP address and the sink IP address detected are those granted by the provider 41 to the users $43_{11}$-$43_{1n}$, it charges the meter rate fee to the users $43_{11}$-$43_{1n}$ using the granted source IP address and the granted sink IP address.

In practice, the charging server 51 performs processing such as adding up a rate fee for each flow based on a meter rate table, for each user $43_{11}$-$43_{1n}$ having a contract for the meter rate system, debiting the total fee for one month as the charge of that month, from the bank account of each user $43_{11}$-$43_{1n}$, and issuing a receipt for it.

Note that the flow information analyzing server 49 synchronizes a packet filter rule with a fire wall server $45_{11}$-$45_{1n}$ once every few minutes, which makes it possible to reduce the cases of erroneously charging users $43_{11}$-$43_{1n}$ for meter rate fees caused by illegitimate network communication terminals 13.

Moreover, after synchronizing packet filter rules the flow information analyzing server 49 checks if wrongful charging was made in the charges made while the last synchronization, before the synchronization of this time, was valid, and thereby if it is found that a wrongful charge was made, this wrongful charge is eliminated. As a result, the flow information analyzing server 49 can perform charging only for flows by legitimate communication, eliminating wrongful charges made between synchronization and next or last synchronization.

In this manner, the network connection service system 40 is designed such that the provider 41 can charge a user $43_{11}$-$43_{1n}$ having a contract for the meter rate system, only for communication desired by the user $43_{11}$-$43_{1n}$.

(2-2) Configuration of Flow Information Analyzing Server 49

Figure 8:
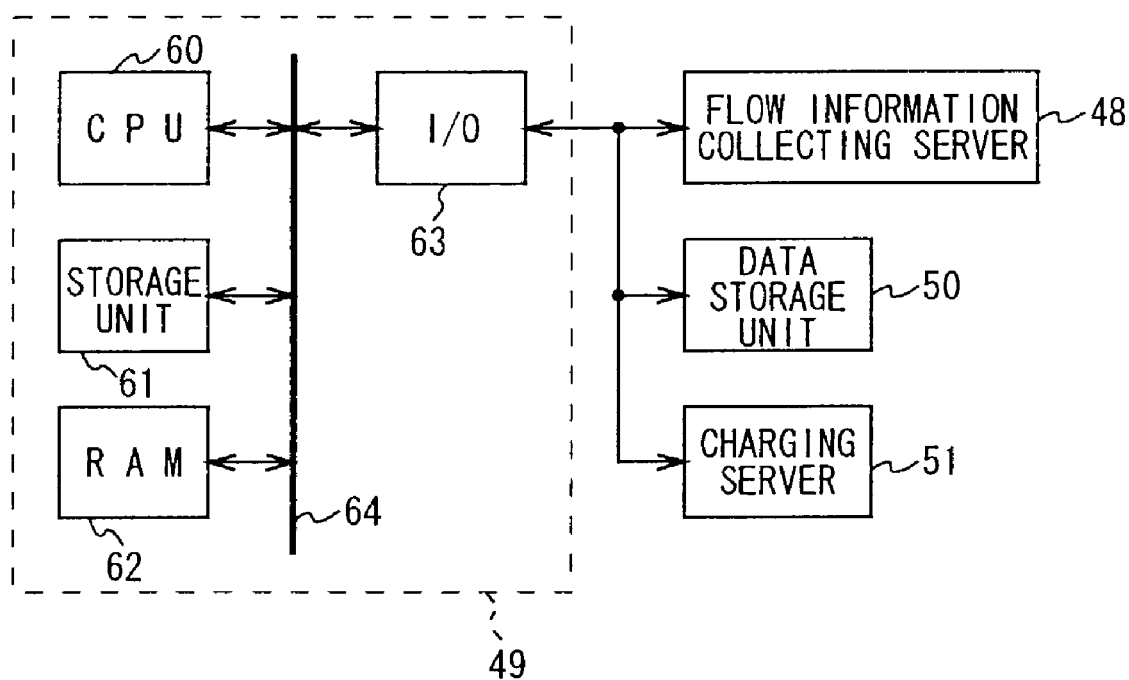
FIG. 8 is a block diagram showing the configuration of a flow information analyzing server.

The configuration of the flow information analyzing server 49 is shown in FIG. 8. As is apparent from FIG. 8, the flow information analyzing server 49 comprises a CPU (Central Processing Unit) 60, a storage unit 61 composed of a hard disk drive or the like, storing various programs, a RAM (Random Access Memory) 62 as a work memory for the CPU 60, and an input/output (I/O) unit 63 functioning as an interface in communication with the flow information collecting server 48, the data storage unit 50, or the charging server 51, all the four components connected to each other with a bus 64.

Figure 9:
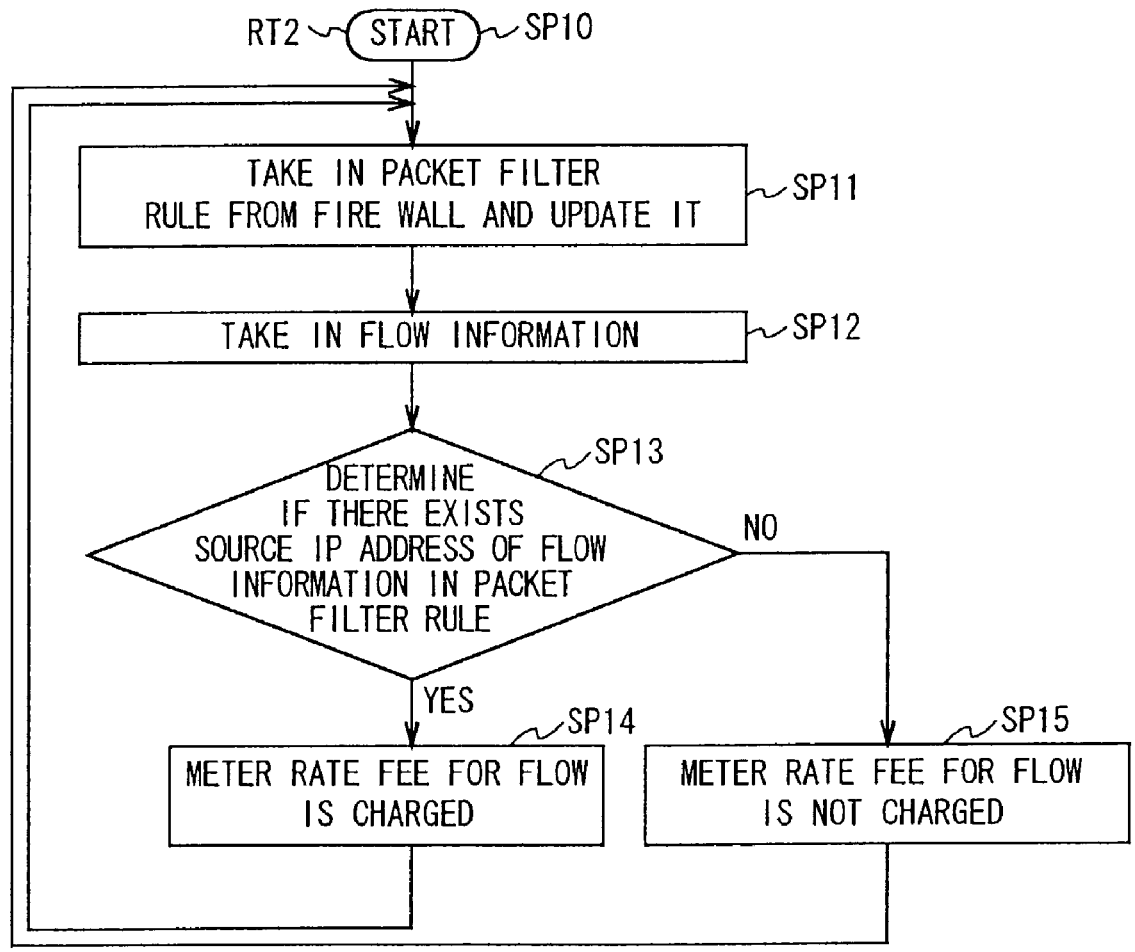
FIG. 9 is a flowchart showing a flow information analysis processing procedure.

The CPU 60 carries out flow information analysis processing procedure RT2 shown in FIG. 9 in accordance with the programs stored in the storage unit 61, thereby determining whether a meter rate fee for each communication made by a user $43_{11}$-$43_{1n}$ having a charging contract for the meter rate system should be charged.

That is, with the flow information analyzing server 49 booted, the flow information analysis processing procedure RT2 starts at step SP10, and the CPU 60 communicates at next step SP11 with a fire wall server $45_{11}$-$45_{1n}$ of a user $43_{11}$-$43_{1n}$ via the I/O unit 63, in order to take in the packet filter rule stored in the fire wall server $45_{11}$-$45_{1n}$.

Subsequently, the CPU 60 proceeds to step SP12 and retrieves flow information on one flow out of the flow information collected in the flow information collecting server 48 by communicating with the flow information collecting server 48 via the I/O unit 63.

Then the CPU 60 proceeds to step SP13 and judges whether the source IP address in the flow information obtained at step SP12 is found among the set-up IP addresses listed in the packet filter rule obtained at step SP12.

When an affirmative result is obtained at step SP13, the CPU 60 interprets that such a flow is transmitted in communication desired by a user $43_{11}$-$43_{1n}$, and proceeds to step SP14 where it is determined that a meter rate fee for the communication should be charged based on a rate table. Then, the CPU 60 returns to step SP11, and repeats the same processing.

Whereas, a negative result, if obtained at step SP13, means that a flow is transmitted in communication undesired by a user $43_{11}$-$43_{1n}$, and then the CPU 60 proceeds to step SP15 where it is determined that a meter rate fee for communication for this particular flow should not be charged, returns to step SP11, and repeats the same processing.

As described above, in the flow information analyzing server 49, communication by a user $43_{11}$-$43_{1n}$ is classified into two kinds of communication: one desired by the user, and the other undesired by the user, in order to charge meter rate fees only for the desired communication.

(2-3) Operations and Effects of this Embodiment

In the above configuration, in this network connection service system 40, with IP addresses which are allowed to access a user $43_{11}$-$43_{1n}$ listed in a packet filter rule stored in a fire wall server $45_{11}$-$45_{1n}$, the source IP address is detected in the flow information of a flow passing through the IP network 3, and when the source IP address is one of the set-up IP addresses listed in the packet filter rule, a meter rate fee for the flow is charged to the user $43_{11}$-$43_{1n}$, and when the source IP address is one other than the set-up IP addresses listed in the packet filter rule, a meter rate fee for the flow is treated as non-charged.

Therefore, according to this network connection service system 40, because a meter rate fee for a flow having an IP address other than the set-up IP addresses is treated as non-charged, it is possible to prevent charging for communication undesired by a user.

According to the above configuration, with IP address which are allowed to access a user $43_{11}$-$43_{1n}$ listed in a packet filter rule stored in a fire wall server $45_{11}$-$45_{1n}$, the source IP address is detected in the flow information of a flow passing through the IP network 3, and when the source IP address is the one of the set-up IP addresses listed in the packet filter rule, a meter rate fee for the flow is charged to the user $43_{11}$-$43_{1n}$ and when the source IP address is one other than the set-up IP addresses listed in the packet filter rule, a meter rate fee for the flow is treated as non-charged, which can prevent charging for communication undesired by a user $43_{11}$-$43_{1n}$, thus making it possible to realize a network connection system with higher reliability in charging.

(2-4) Other Modes of Embodiment

In the foregoing embodiment, explanation is given on the case where a packet file rule stored in a fire wall server $45_{11}$-$45_{1n}$ is transmitted to the flow information analyzing server 49 which uses the packet filter rule and decides that communication undesired by a user $43_{11}$-$43_{1n}$ is not charged. The present invention, however, is not limited to it, and it may be designed such that a log (this is referred to as "destroyed log" hereinafter) regarding packets destroyed in a fire wall server $45_{11}$-$45_{1n}$ is transmitted to the information analyzing server 49 which then determines based on this destroyed log that a meter rate fee for communication undesired by a user $43_{11}$-$43_{1n}$ is not charged.

In this case, if a mater rate fee has been already charged for communication undesired by a user, the flow information analyzing server 49 deletes this charge for this communication, and when a user is not yet charged a meter rate fee for the communication undesired by the user, the flow information analyzing server 49 does not calculate a meter rate fee for this communication.

Also, in the foregoing embodiment, explanation is given on the case where the flow information collecting server 48, the flow information analyzing server 49, and the charging server 51 provided discretely perform different processing for charging. The present invention, however, is not limited to it, and such processing may be all performed by a single server for the charging processing.

Furthermore, in the foregoing embodiment, explanation is given on the case where charging is made for the fee for a flow based on set-up IP addresses listed in a packet filter rule, however, the present invention is not limited to it, and it may be designed such that meter rate fees charged for flows may be deleted, as needed, by conducting examination also on meter rate fees charged before a packet filter rule is synchronized.

Still further, in the foregoing embodiment, explanation is given on the case where a packet filter rule is transmitted to the flow information analyzing server 49 once a few minutes. The present invention, however, is not limited to it, and a packet filter rule may be transmitted to the flow information analyzing server 49 at a given interval; once a few hours for example. Note that, in this case, destroyed logs as mentioned above may be transmitted to the flow information collecting server 48 at such a given interval.

Still further, in the foregoing embodiment, explanation is given on the case where a packet filter rule is transmitted to the flow information analyzing server 49 at a given interval. However, the present invention is not limited to it, and a fire wall server $45_{11}$-$45_{1n}$ may change the interval for transmitting a packet filter rule according to the amount of communication in such a case that the amount of communication fluctuates due to an increased amount of communication by malign access from network communication terminals for example. In this case, destroyed logs as mentioned above may be transmitted to the flow information collecting server 48 at such a given interval.

Still further, in the foregoing embodiment, explanation is made on the case where a fire wall server $45_{11}$-$45_{1n}$ transmits the packet filter rule to the flow information analyzing server 49 at a given interval. The present invention, however, is not limited to it and a fire wall server $45_{11}$-$45_{1n}$ may transmits the packet filter rule at the time of destroying packets and accordingly updating the packet filter rule. In this case, the aforementioned destroyed logs may be transmitted to the flow information collecting server 48 at such an interval.

Still further, in the foregoing embodiment, explanation is given on the case where a fire wall server $45_{11}$-$45_{1n}$ is employed as a communication control means, however, the present invention is not limited to it, and a communication limiting function may be provided in connection devices such as routers $44_{11}$-$44_{1n}$, hubs, and bridges.

Still further, in the foregoing embodiment, explanation is given on the case where a CPE router $44_{11}$-$44_{1n}$ is used as a collecting means, however, the present invention is not limited to it, and devices capable of functioning in a network, such as servers, hubs and bridges, may be employed.

Still further, in the foregoing embodiment, explanation is given on the case where charging is performed for each flow based on access limited by a fire wall server $45_{11}$-$45_{1n}$, however, the present invention is not limited to it, and it may be designed such that a CPE router $44_{11}$-$44_{1n}$ may limit access, based on which charging is made for each flow.

Still further, in the foregoing embodiment, explanation is given on the case where the present invention is applied to the network connection service system 40 offering the Internet connection service. However, the present invention is not limited to it, and may be applied widely to meter rate fee posting systems to calculate meter rate fees for networks such as LANs (Local Area Network) and telephone circuits other than the Internet.

Still further, in the foregoing embodiment, explanation is given on the case where a meter rate fee is calculated for each flow, however, the present invention is not limited to it, and meter rate fees may be calculated by amount of communication time, the number of communication bytes, the number of flows or the like.

Still further, in the foregoing embodiment, explanation is given on the case where a designating means for designating a series of destroyed packets is employed to compare set-up IP addresses listed in a packet filter rule to the IP address of a packet, and to give a notice of the IP address instead of packets if the IP address is not found from the set-up IP addresses. The present invention, however, is not limited to it and any means may be employed as long as it can give a notice of the IP address of rejected packets in such a way of detecting the IP address of the packets rejected by a fire wall server $45_{11}$-$45_{1n}$ and giving a notice of the detected IP address.

Figure 10:
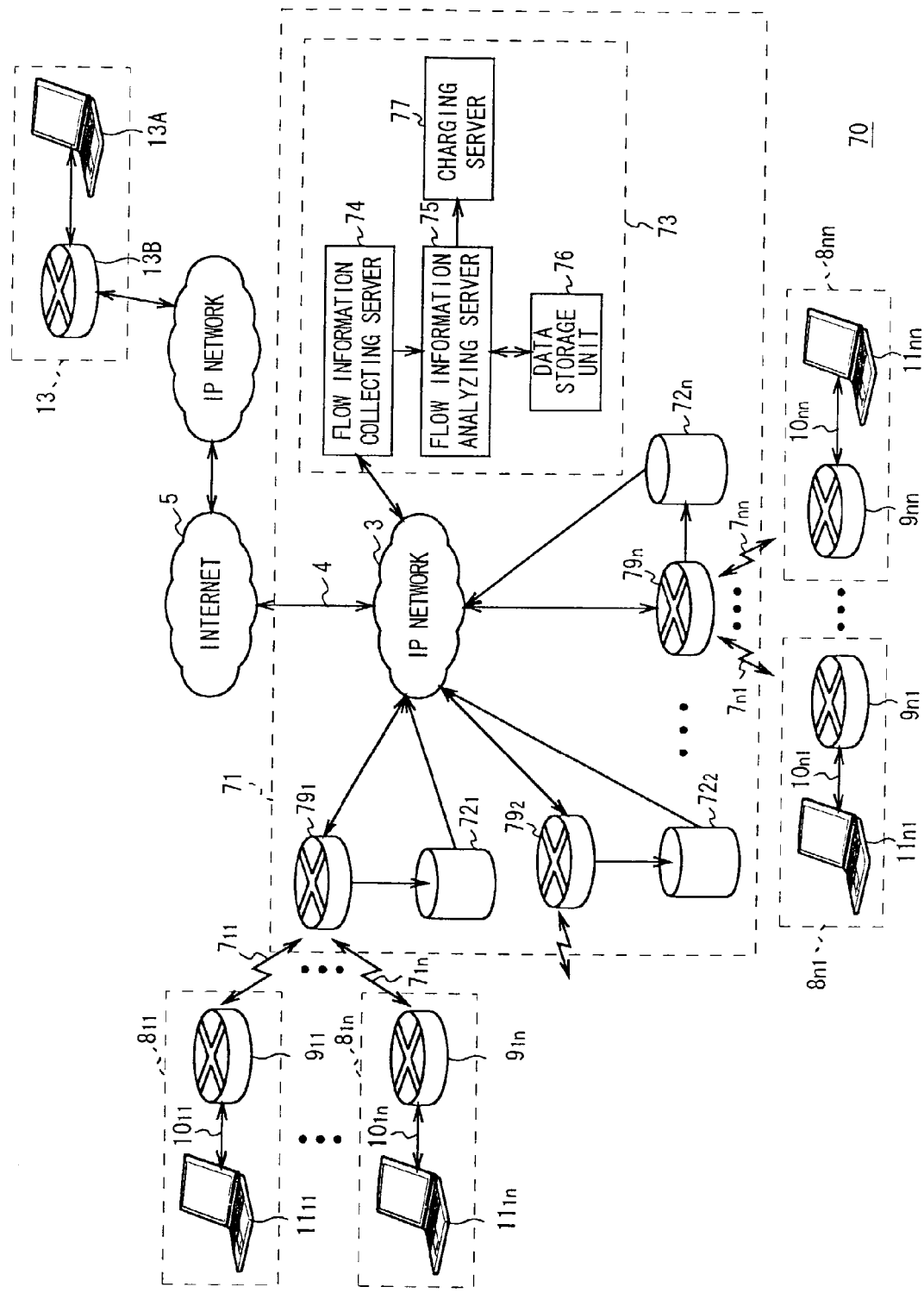
FIG. 10 is a block diagram showing the configuration of a network connection service system in the third embodiment.

(3) Third Embodiment (3-1) Configuration of Network Connection Service System in Third Embodiment In FIG. 10 where the same reference numerals are applied to parts corresponding to those of FIG. 17, reference numeral 70 shows a network connection service system of a third embodiment as a whole, where an IP network 3 owned by a provider 71 is connected to the Internet 5 with a leased line 4.

Also, the IP network 3 is connected to a plurality of edge routers $79_1$-$79_n$, each of which is connected with a wired or wireless leased line $7_1$-$7_n$ to the router $9_{11}$-$9_{1n}$ of each user $8_{11}$-$8_{1n}$ granted a personal and fixed IP address by making a contract with the provider 71 for leased line IP connection.

Moreover, each router $9_{11}$-$9_{1n}$ is connected to an Internet communication terminal $11_{11}$-$11_{1n}$, such as a personal computer, with a communication line $10_{11}$-$10_{1n}$ of each user $8_{11}$-$8_{1n}$ such as an in-house LAN for example.

Thereby, in the network communication service system 70 each user $8_{11}$-$8_{1n}$ may connect his network communication terminal $11_{11}$-$11_{1n}$ to another network communication terminal $11_{11}$-$11_{1n}$ via the leased line $7_1$-$7_n$, edge router $79_1$-$79_n$, and IP network 3 with the IP address granted by the provider 71 as well as to another network communication terminal 13A via the Internet 5 and the IP network 3. Thus, each user $8_{11}$-$8_{1n}$ can transmit or receive flows as desired information by communicating with each other.

Meanwhile, when any user $8_{11}$-$8_{1n}$ connected to a router $9_{11}$-$9_{1n}$ makes communication via the IP network 3 and a flow passes through an edge router $79_1$-$79_n$, the edge router $79_1$-$79_n$ detects the source IP address and the sink IP address, etc., in the header data etc., of the flow, and simultaneously measures the amount of communication of the flow.

Then the edge router $79_1$-$79_n$ collectively outputs the information thus obtained (this is referred to as "flow information" en masse hereinafter") on a plurality of flows, to a flow information storage unit $72_1$-$72_n$ connected to the corresponding edge router $79_1$-$79_n$ and the information is then stored in the flow information storage unit $72_1$-$72_n$.

In this manner the flow information of each flow stored in each flow information storage unit $72_1$-$72_n$ is subsequently collected in a flow information collecting server 74 provided in a charging center 73 via the IP network 3. Then a flow information analyzing server 75 performs charging processing based on the flow information accumulated in the flow information collecting server 74, to charge a meter rate fee for each flow to the recipient and the sender.

At this stage, the flow information analyzing server 75 lets a data storage unit 76 composed of a hard disk drive or the like, store in advance an IP address table as shown in FIG. 11 and a charging matrix table as shown in FIG. 12, in order to use the stored IP address table and charging matrix table in performing charging processing based on the flow information collected from each flow information storage unit $72_1$-$72_n$.

This IP address table lists, as shown in FIG. 11, the IP addresses of network terminals $11_{11}$-$11_{1n}$ connected to the edge routers $79_1$-$79_n$, with the listed IP addresses classified by each edge router $79_1$-$79_n$.

Meanwhile, in the charging matrix table, as shown in FIG. 12, the source and the sink of a flow passing through an edge router $79_1$-$79_n$ are described on a basis of a relationship with the edge router $79_1$-$79_n$.

Specifically, in the charging matrix table, an edge router $79_1$-$79_n$ itself is described as "own edge router", other edge routers $79_1$-$79_n$ owned by the same business (provider) as "another edge router", and other businesses as "another business".

Moreover, the charging matrix table shows the total of eight cases as combinations of "own edge router", "another edge router", and "another business" in relation to the source and the sink of a flow. Also, the charging matrix table describes the contents of the charging processing for each case, for example, "charge to sender and recipient (users $8_{11}$-$8_{1n}$)" as in the case 1.

That is, in performing the charging processing for each flow, the flow information analyzing server 75 detects the source IP address and the sink IP address in the flow information, and ascertains based on the IP address table (FIG. 11) which edge router $79_1$-$79_n$ each of the detected IP addresses belongs to.

Subsequently, the flow information analyzing server 75 classifies each edge routers $79_1$-$79_n$ to which the confirmed source IP address and sink IP address belong, into "own edge router", "another edge router", or "another business" based on the source edge router $79_1$-$79_n$ of the flow information.

Next, after ascertaining a case of the charging matrix table (FIG. 12) to which the result of classification on the source and the sink belongs to, the flow information analyzing server 75 confirms the contents of the charging processing of the case ascertained.

Then the flow information analyzing server 75 transmits the flow information to a charging server 77, and notifies the charging server 77 of the confirmed result of the contents of the charging processing.

Subsequently, the charging server 77 determines the subject, sender and/or recipient, to be charged a meter rate fee for the flow, on the basis of the confirmed result given from the flow information analyzing server 75.

Then the charging server 77 calculates a meter rate fee for the flow based on the flow information given from the flow information analyzing server 75, according to a preset rate table not shown in figure.

In charging the meter rate fee thus calculated, the charging server 77 detects the source IP address and the sink IP address in the flow information, and if the detected source IP address and sink IP address are found to be those granted by the provider 71 to the users $8_{11}$-$8_{1n}$, the equivalent of the meter rate fee is charged to the users $8_{11}$-$8_{1n}$ having the granted source IP address and sink IP address.

In practice, the charging server 77 performs such processing as adding up a fee for each flow calculated according to a meter rate for each user $8_{11}$-$8_{1n}$ having a contract for the meter rate system, debiting the total amount for one month as a charge of that month, from the bank account of each user $8_{11}$-$8_{1n}$, and issuing a receipt.

As described above, the network connection service system 70 is designated to be capable of preventing a meter rate fee for a flow by communication from being charged twice to users $8_{11}$-$8_{1n}$ when the users $8_{11}$-$8_{1n}$ each having a contract with the provider 71 communicate with each other.

(3-2) Example of Processing of Selecting Users to be Charged by Information Analyzing Server 75

Explanation is given by specific examples on how the information analyzing server 75 selects users to be charged based on the source IP address and the sink IP address included in flow information.

(3-2-1) First Specific Example

Figure 13:
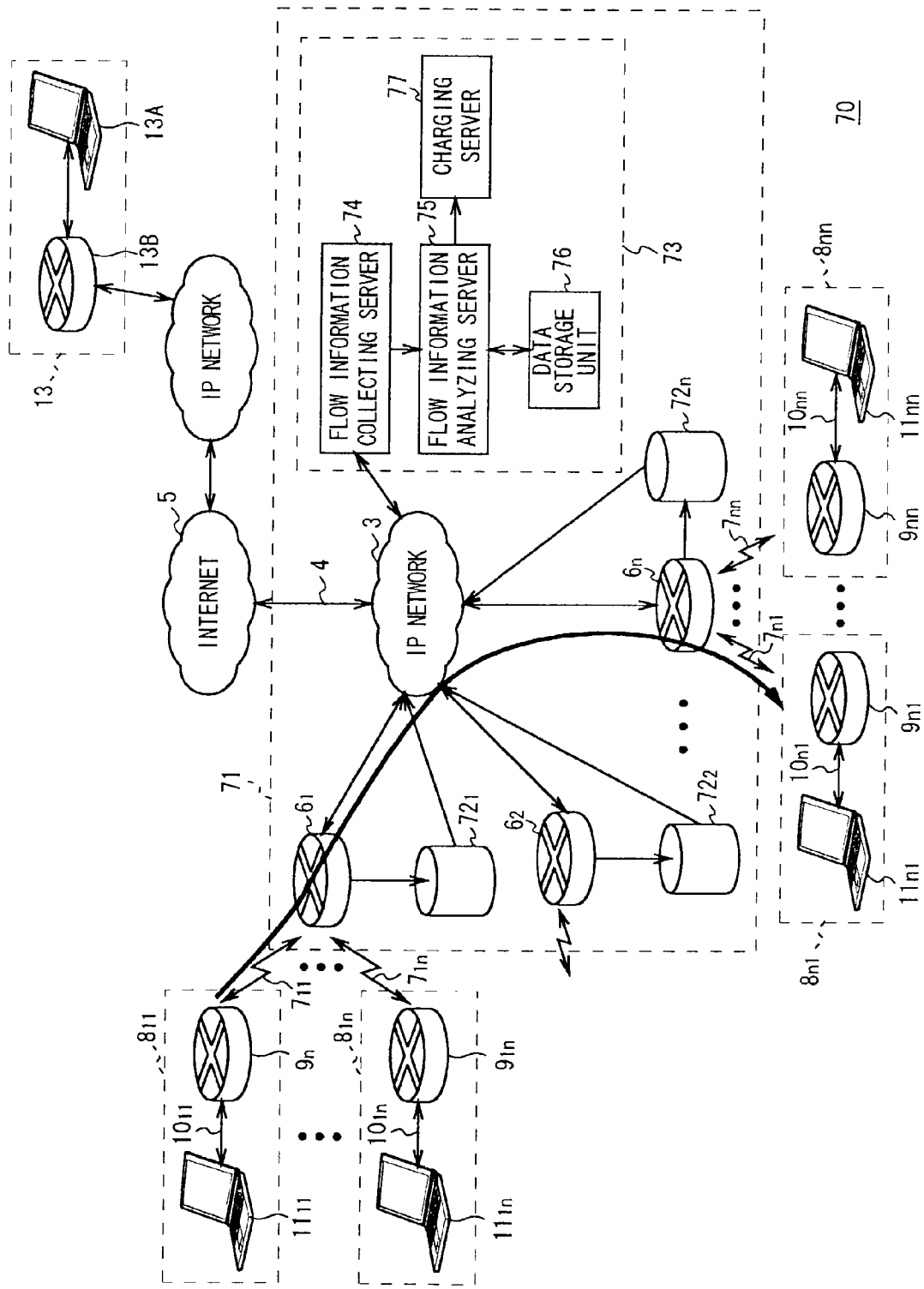
FIG. 13 is a schematic diagram used in explaining a specific example (1) of communication.

First, in a network connection service system 70, as shown in FIG. 13, in the case where a first user $8_{11}$ sends a communication to a second user $8_{n1}$, the first user $8_{11}$ uses the IP address ("192.168.1.1") granted by a provider 71 to connect a first network communication terminal $11_{11}$ to a second network communication terminal $11_{n1}$ via a first edge router $79_1$, the IP network 3, and a second edge router $79_n$, thus establishing communication with the second user $8_{n1}$. Assume here that the second user $8_{n1}$ is granted "172.168.2.1" as an IP address by the provider 71.

In this case, since a flow passes through the first edge router $79_1$ and the second edge router $79_n$, the first flow information is stored in a first flow information storage unit $72_1$ of the first edge router $79_1$, and the second flow information is stored in a second flow information storage unit $72_n$ of the second edge router $79_n$.

Then the first edge router $79_1$ transmits the first flow information at a given interval from the first flow information storage unit $72_1$ to the flow information analyzing server 75 via the flow information collecting server 74. Also, the second edge router $79_n$ transmits the second flow information at a given interval from the second flow information storage unit $72_n$ to the flow information analyzing server 75 via the flow information collecting server 74.

Subsequently, the flow information analyzing server 75 performs analysis processing on the first flow information and second flow information received in order of arrival.

That is, by analyzing the first flow information given from the first edge router $79_1$, the flow information analyzing server 75 detects based on the first flow information that the source IP address is "192.168.1.1" and the sink IP address is "172.168.2.1".

Then, the flow information analyzing server 75 ascertains, by reference to the IP address table (FIG. 11), that the source IP address ("192.168.1.1") belongs to the edge router A (the first edge router 791) and the sink IP address ("172.168.2.1") belongs to the edge router B (the second edge router $79_n$).

Subsequently, from the fact that the flow information was transmitted from the edge router A, the flow information analyzing server 75 ascertains that the source belongs to the "own edge router" and the sink belongs to "another edge router".

Accordingly, after making sure that the confirmed result corresponds to the case 2 in the charging matrix table (FIG. 12), the flow information analyzing server 75 transmits to the charging server 77 such a command for charging processing that charging should be made to the first user $8_{11}$ who is the sender and the second user $8_{n1}$ who is the recipient.

Consequently the charging server 77 charges a meter rate fee for the flow to the first user $8_{11}$ who is the sender of the flow and the second user $8_{n1}$ who is the recipient of the flow.

Meanwhile, by analyzing the second flow information given from the second edge router $79_n$, the flow information analyzing server 75 detects based on the second flow information that the source IP address is "192.168.1.1" and the sink IP address is "172.168.2.1".

Then, the flow information analyzing server 75 ascertains, by reference to the IP address table (FIG. 11), that the source IP address ("192.168.1.1") belongs to the edge router A (the first edge router $79_1$) and the sink IP address ("172.168.2.1") belongs to the edge router B (the second edge router $79_n$).

Subsequently, from the fact that the flow information was transmitted from the edge router B the flow information analyzing server 75 ascertains that the source belongs to "another edge router" and the sink belongs to "own edge router".

Accordingly, after making sure that the confirmed result corresponds to the case 4 in the charging matrix table (FIG. 12), the flow information analyzing server 75 transmits to the charging server 77 such a command for charging processing that charging should not be made to the first user $8_{11}$ who is the sender and the second user $8_{n1}$ who is the recipient.

As a result, the charging server 77 does not charge the first user $8_{11}$ who is the sender of the flow and the second user $8_{n1}$ who is the recipient of the flow.

Thus, the flow information analyzing server 75 is designed to be capable of charging a meter rate fee for the flow to the first user $8_{11}$ who is the sender and the second user $8_{n1}$ who is the recipient, avoiding a double charge.

For additional information, in the case where the second user $8_{n1}$ sends a communication to the first user $8_{11}$, the charging server 77 performs the charging processing of the case 4 based on the first flow information and performs the charging processing of the case 2 based on the second flow information.

(3-2-2) Second Specific Example

Figure 14:
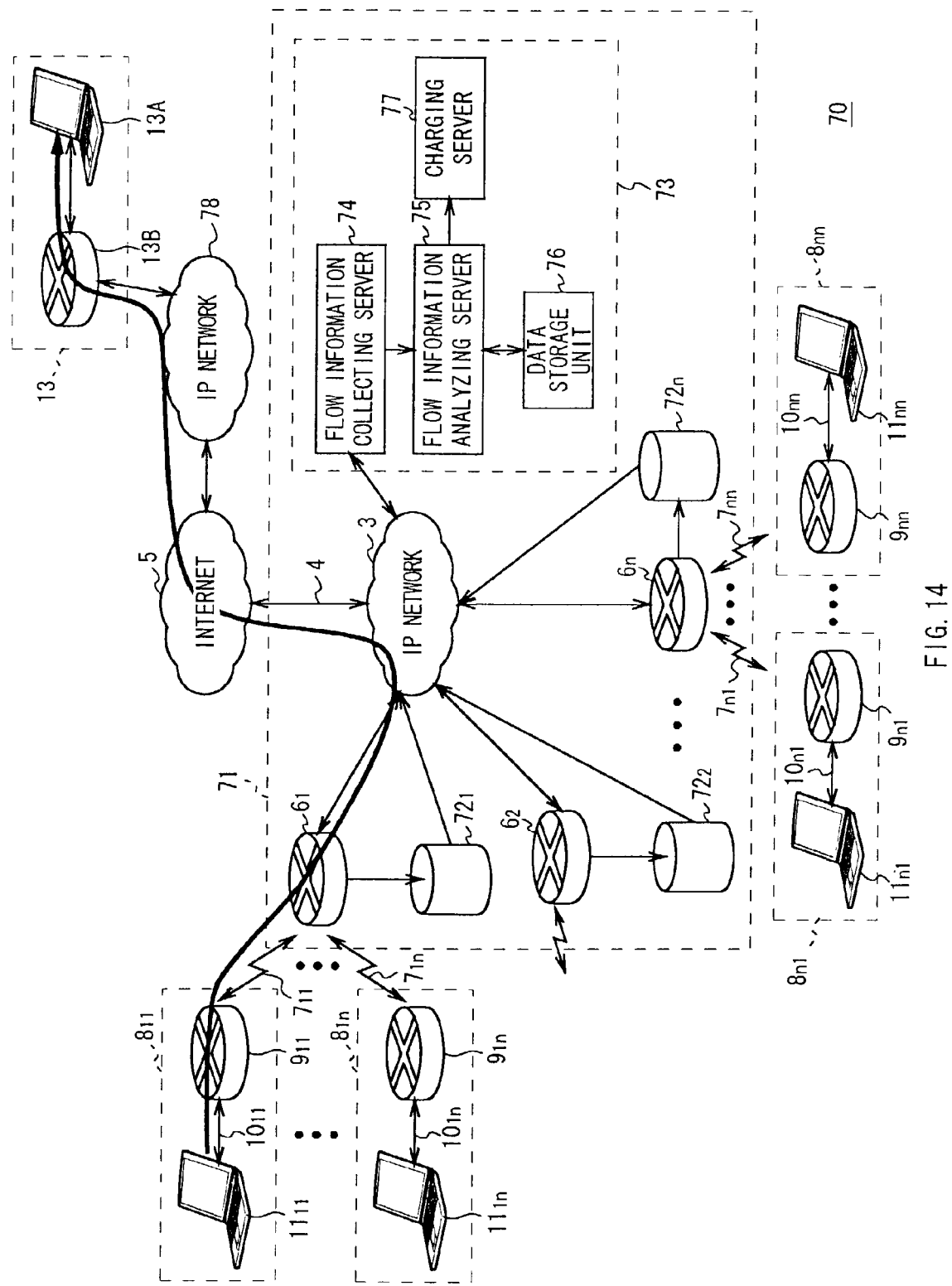
FIG. 14 is a schematic diagram used in explaining a specific example (2) of communication.

Next, in a network connection service system 70, as shown in FIG. 14, in the case where a first user $8_{11}$ sends a communication to a user 13 of another provider (this is called "another user" hereinafter), the first user $8_{11}$ uses an IP address ("192.168.1.1") granted by a provider 71 to connect a first network communication terminal $11_{11}$ to another network communication terminal 13A via a first edge router $79_1$, the IP network 3, and the Internet 5, thus establishing communication with the other user 13. Assume here that the other user 13 is granted "200.196.7.8" as an IP address by another provider 78.

In this case, since a flow passes through only the first edge router $79_1$, the first flow information is stored into a first information storage unit $72_1$, of the first edge router $79_1$.

Then the first edge router $79_1$ transmits the first flow information at a given interval from the first flow information storage unit $72_1$ to the flow information analyzing server 75 via the flow information collecting server 74.

Subsequently, the flow information analyzing server 75 performs analysis processing on the first flow information received.

That is, by analyzing the first flow information given from the first edge router $79_1$, the flow information analyzing server 75 detects based on the first flow information that the source IP address is "192.168.1.1" and the sink IP address is "200.196.7.8".

Then, the flow information analyzing server 75 ascertains, by reference to the IP address table shown in FIG. 11, that the source IP address ("192.168.1.1") belongs to the edge router A (the first edge router $79_1$) and that the sink IP address ("200.196.7.8") belongs to another edge router because it cannot be found in the IP address table.

Subsequently, from the fact that the flow information was transmitted from the edge router A, the flow information analyzing server 75 ascertains that the source belongs to "own edge router" and the sink belongs to "another business".

Accordingly, after making sure that the confirmed result corresponds to the case 3 in the charging matrix table shown in FIG. 12, the flow information analyzing server 75 transmits to the charging server 77 such a command for charging processing that charging should be made to only the first user $8_{11}$ who is the sender.

Consequently, the charging server 77 charges a meter rate fee for the flow to only the first user $8_{11}$ who is the sender.

In this way, the flow information analyzing server 75 is designed to be capable of charging the meter rate fee for the flow to only the first user $8_{11}$ having a contract with the provider 71.

For additional information, in the case where the other user sends a communication to the first user $8_{11}$, the charging server 77 performs the charging processes of the case 7 based on the flow information.

Thereby, the provider 71 can always charge correct fees to the users $8_{11}$-$8_{1n}$ each having a contract for the meter rate system for flows, avoiding a double charge.

In the case where a flow passes through an edge router $79_1$-$79_n$ located between two edge routers $79_1$-$79_n$ owned by the same provider 71, the data analyzing server 75 finds that this case belongs to the case 5 in the charging matrix table shown in FIG. 12, as a result of an analysis of the flow information of the flows, so that no charge is ever made to the users $8_{11}$-$8_{1n}$.

(3-3) Configuration of Flow Information Analyzing Server 75

Figure 15:
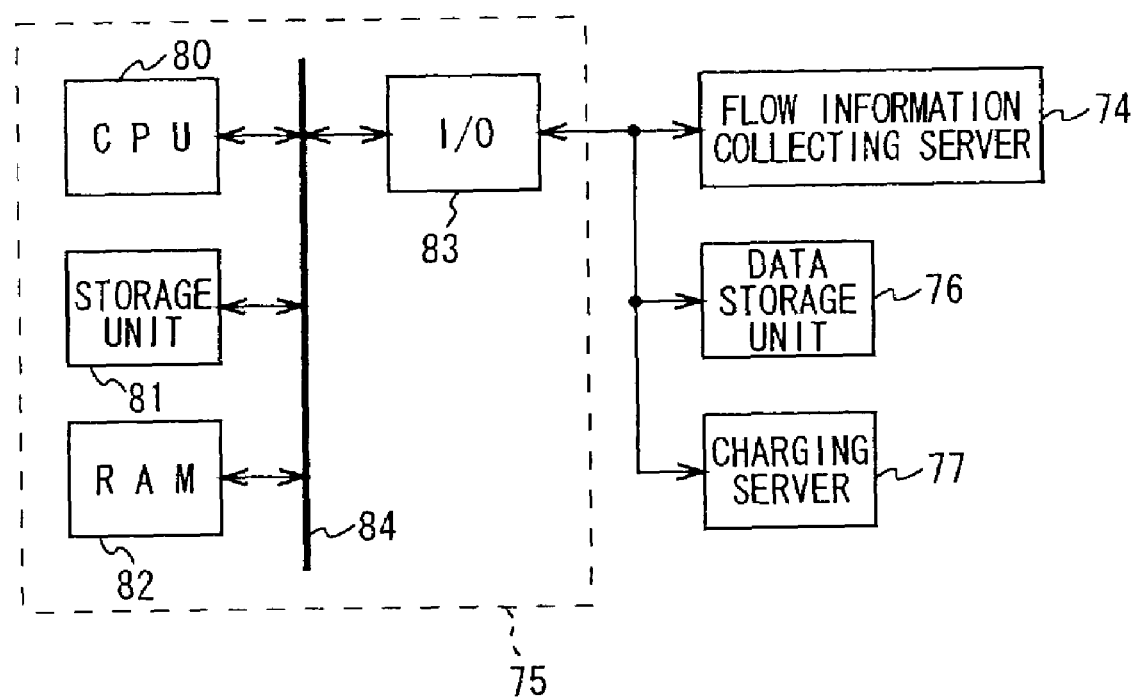
FIG. 15 is a block diagram showing the configuration of a flow information analyzing server.

The configuration of the flow information analyzing server 75 is shown in FIG. 15. As is apparent from FIG. 15, the flow information analyzing server 75 comprises a CPU (Central Processing Unit) 80, a storage unit 81 composed of a hard disk drive or the like, storing various programs, a RAM (Random Access Memory) 82 as a work memory for the CPU 80, and an input/output (I/O) unit 83 functioning as an interface in communication with the flow information collecting server 74, the data storage unit 76, or the charging server 77, all the four components connected to each other with a bus 84.

Figure 16:
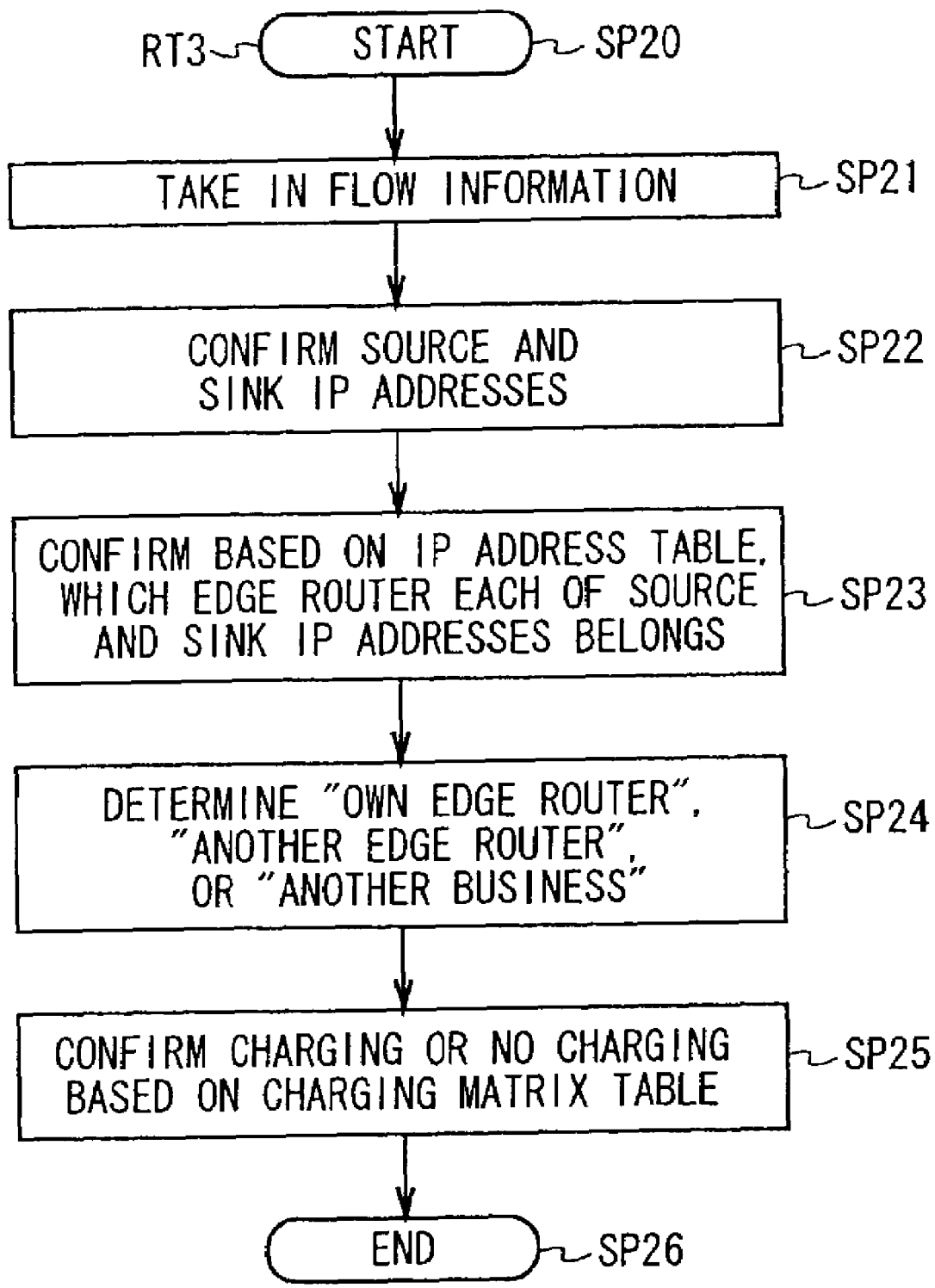
FIG. 16 is a flowchart showing a flow information analysis processing procedure.

The CPU 80 can avoid charging each user $8_{11}$-$8_{1n}$ for the same flow two times by executing a charging processing procedure RT3 shown in FIG. 16 in accordance with the programs stored in the storage unit 81.

Specifically, flow information is collected into the flow information collecting server 74, and after the charging processing procedure RT3 starts at step SP21, the CPU 80 takes in the flow information on one flow out of the flow information stored in the flow information collecting server 74 by communicating with the flow information collecting server 74 via the I/O unit 83 at following step SP21.

Subsequently, the CPU 80 proceeds to step SP23 to confirm the source IP address and the sink IP address of the flow in regard to the flow information obtained at step SP21.

Then at following step SP23, the CPU 80 communicates with the data storage unit 76 via the I/O unit 83 to ascertain which edge router $79_1$-$79_n$ each of the source AS address and the sink AS address belongs to, by reference to the IP address table (FIG. 11) stored in the data storage unit 76. That is, the CPU 80 ascertains that the flow was transmitted from which edge router $79_1$-$79_n$ to which edge router $79_1$-$79_n$.

Next, the CPU 80 proceeds to step SP24 to detect which the edge routers $79_1$-$79_n$ of the source and the sink of the flow confirmed at step SP23 belongs to, "own edge router", "another edge router", or "another business", relative to the edges router $79_1$-$79_n$ which is the source of the flow information obtained at step SP21.

Then at following step SP25, the CPU 80 communicates with the data storage unit 76 via the I/O unit 83 to detect, by reference to the charging matrix table (FIG. 12) stored in the data storage unit 76, whether or not charging should be made to the sender and the recipient of the flow, based on the confirmed result obtained at step SP24, and the CPU 80 then proceeds to step SP26 where the charging processing procedure RT3 is terminated.

In this manner, in the flow information analyzing server 75 the charging processing can be performed, avoiding a double charge to the users $8_{11}$-$8_{1n}$.

(3-4) Operations and Effects of this Embodiment

In the above configuration, the flow information analyzing server 75 of the network connection system 70 obtains the flow information of a flow passing through an edge router $79_1$-$79_n$ thus detecting the source IP address and the sink IP address of the flow in the obtained flow information, whereby it is ascertained based on the IP address table which edge routers $79_1$-$79_n$ the detected source IP address and the sink IP address belong to.

When the edge routers near the source and the sink of the flow are ascertained, the flow information analyzing server 75 determines the contents of the charging processing based on the charging matrix table, and in the case where the sink and the source are both in the same business, the charging processing is performed to the sender and the recipient based on one of the flow information transmitted from the edge router $79_1$-$79_n$ near the sink and the flow information transmitted from the edge router $79_1$-$79_n$ near the source.

Therefore, according to the network connection service system 70, charging is made to users $8_{11}$-$8_{1n}$, which are the sender and the recipient, on the basis of one out of two items of flow information transmitted from the edge routers $79_1$-$79_n$ corresponding to the sink and the source of the flow, thus avoiding double charge to each users $8_{11}$-$8_{1n}$ for the meter rate fee.

According to the above configuration, the flow information of a flow passing through an edge router is obtained, the source IP address and the sink IP address of the flow are detected in the obtained flow information, and it is ascertained which edge routers $79_1$-$79_n$ the detected source IP address and sink IP address belong to, by reference to the IP address table, and when the edge routers $79_1$-$79_n$ near the source and the sink are confirmed, the contents of the charging processing are determined by reference to the charging matrix table. Then, in the case where the sink and the source are both in the same business, the charging processing is performed to the sender and the recipient based on one out of the flow information transmitted from the edge router $79_1$-$79_n$ near the sink and the flow information transmitted from the edge router $79_1$-$79_n$ near the source, thus making it possible to avoid double charge Lo each user $8_{11}$-$8_{1n}$ for the meter rate fee, with the result that a network connection system may be realized that can avoid charging unclear fees to users $8_{11}$-$8_{1n}$.

(3-5) Other Embodiments

In the above embodiment, explanation is given on the case where as a method for avoiding a double charge for communication within the same business, charging is made based on the contents of processing, namely the contents of charging processing of the case 2 in the charging matrix table (FIG. 12), that is, "charge to sender and recipient", and the contents of charging processing of the case 4, that is, "no charge", thus avoiding a double charge as a whole. The present invention, however, is not limited to it, and a double charge may be avoided as a whole by the contents of processing of "charge to sender only" and "charge to recipient only".

Also, in the above embodiment, explanation is given on the case where the flow information collecting server 74, the flow information analyzing server 75, and the charging server 77 provided discretely perform different processing for charging. The present invention, however, is not limited to it, and such processing may be performed by a single server for the charging processing.

Furthermore, in the above embodiment, explanation is given on the case where the present invention is applied to the network connection service system 70 offering Internet connection service, however, the present invention is not limited to it, and may be applied widely to meter rate posting systems which perform calculating meter rate fees for networks other than the Internet, such as LANs (Local Area Network), and telephone circuits.

Still further, in the above embodiment, explanation is given on the case where a meter rate fee is calculated for each flow, however, the present invention is not limited to it, and a meter rate fee may be calculated by amount of communication time, the number of communication bytes, the number of flows, or the like.

Still further, in the above the embodiment, explanation is given on the case where charging is made to the users $8_{11}$-$8_{1n}$, who are the recipient and the sender, on the basis of the flow information transmitted from the edge routers $79_1$-$79_n$ near the sink and the source. The present invention, however, is not limited to it, and charging may be performed based on the flow information from edge routers $79_1$-$79_n$ located on a route between a sink and a source by adjusting the charging matrix table. This may cope with such a case that other users $8_{11}$-$8_{1n}$ between the users $8_{11}$-$8_{1n}$ who are the recipient and the sender, want to use flows.

INDUSTRIAL UTILIZATION

The present invention may be applied to network connection service systems offering Internet connection service and data transmission/reception service via network for example.

The invention claimed is:

1. A meter rate fees charging apparatus for charging a meter rate fee to a sender by amount of use of a computer network offering Internet connection services, comprising:
   receiving means for receiving information transmitted to a recipient via the computer network as part of the services, the information being transmission information composed of communication information having the personal information of the sender, including a source IP address, and the personal information of the recipient, including a sink IP address, and zone information denoting a zone where the recipient is;
   detecting means for detecting the personal information and the zone information of the recipient in the transmission information; and
   charging processing means for determining whether to charge the sender, the recipient, or the sender and the recipient based on a classification of an edge router associated with the source IP address and an edge router associated with the sink IP address,
   wherein if the charging processing means determines to charge the sender, the charging processing means makes a charge of the meter rate fee to the sender based on the zone information and an amount of time for a flow of Internet communication to reach the edge router associated with the source IP address from the edge router associated with the sink IP address,
   wherein the edge router associated with the source IP address is connected to a user router corresponding to the sender and the user router corresponding to the sender is connected to a sender communication terminal, and
   wherein the edge router associated with the sink IP address is connected to a user router corresponding to the recipient and the user router corresponding to the recipient is connected to a recipient communication terminal.

2. The meter rate fees charging apparatus according to claim 1, wherein the charging processing means makes a charge to the recipient based on the zone information and at least one of amount of communication for a flow, amount of communication time spent for a flow, and number of flows.

3. The meter rate fees charging apparatus according to claim 1, wherein the receiving means, the detecting means, and the charging processing means are integrated into one.

4. A meter rate fees charging method for charging a meter rate fee to a sender by amount of use of a computer network offering Internet connection services, comprising:
   receiving information transmitted to a recipient via the computer network as part of the services, the information being transmission information composed of communication information having the personal information of the sender, including a source IP address, and the personal information of the recipient, including a sink IP address, and zone information denoting a zone where the recipient is;
   detecting the personal information and the zone information of the recipient in the transmission information; and
   determining whether to charge the sender, the recipient, or the sender and the recipient based on a classification of an edge router associated with the source IP address and an edge router associated with the sink IP address,
   wherein if the determination is to charge the sender, charging the meter rate fee to the sender, wherein the meter rate fee is based on the zone information and the amount of time for a flow of Internet communication to reach the edge router associated with the source IP address from an edge router associated with the sink IP address,
   wherein the edge router associated with the source IP address is connected to a user router corresponding to the sender and the user router corresponding to the sender is connected to a sender communication terminal, and
   wherein the edge router associated with the sink IP address is connected to a user router corresponding to the recipient and the user router corresponding to the recipient is connected to a recipient communication terminal.

5. The meter rate fees charging method according to claim 4, further comprising charging the recipient based on the zone information and at least one of amount of communication for a flow, amount of communication time spent for a flow, and number of flows.

6. A meter rate fees charging apparatus for charging each user a meter rate fee in accordance with the use of a computer network, offering Internet connection services, between a recipient and a sender, comprising:
   collecting means for collecting information of the recipient and the sender, including a source IP address and a sink IP address, out of transmission information transmitted from the sender to the recipient via the computer network, and communication information needed for charge processing;
   determining means for determining whether to charge the sender, the recipient, or the sender and the recipient based on a classification of an edge router associated with the source IP address and an edge router associated with the sink IP address; and charging means for charging a meter rate fee, calculated based on the communication information, to the sender, the recipient, or the sender and the recipient based on the determination, wherein the charging means charges a meter rate fee, obtained based on the communication information and an amount of time for a flow of Internet communication to reach the edge router associated with the source IP address from the edge router associated with the sink IP address, to the recipient only in the case where the sender of the transmission information is not prohibited from using the computer network offering the services, wherein the edge router associated with the source IP address is connected to a user router corresponding to the sender and the user router corresponding to the sender is connected to a sender communication terminal, and wherein the edge router associated with the sink IP address is connected to a user router corresponding to the recipient and the user router corresponding to the recipient is connected to a recipient communication terminal.

7. The meter rate fees charging apparatus according to claim 6, wherein the charging means recognizes, by being notified of allowed senders, from a communication limiting means provided in the computer network to limit the use of the network, that a sender not identical to any of the allowed senders is prohibited from using the network.

8. The meter rate fees charging apparatus according to claim 6, wherein the charging means recognizes, by being notified of senders prohibited from communication, from a communication limiting means provided in the computer network to limit the use of the computer network, that a sender identical to any of the prohibited senders is prohibited form using the network.

9. The meter rate fees charging apparatus according to claim 6, wherein the collecting means and the charging means are integrated into one.

10. The meter rate fees charging apparatus according to claim 6, wherein the communication information is updated at a given interval.

11. A meter rate fees charging method for charging each user a meter rate fee in accordance with the use of a computer network offering Internet connection services, between a recipient and a sender, comprising:
    collecting information of the recipient and the sender, including a source IP address and a sink IP address, out of transmission information transmitted from the sender to the recipient via the computer network, and communication information needed for charge processing;
    determining whether to charge the sender, the recipient, or the sender and the recipient based on a classification of an edge router associated with the source IP address and an edge router associated with the sink IP address; and
    charging a meter rate fee, calculated based on the communication information and an amount of time for a flow of Internet communication to reach the edge router associated with the source IP address from the edge router associated with the sink IP address, to the recipient only in the case where the sender of the transmission data is not prohibited from using the computer network offering the services,
    wherein the edge router associated with the source IP address is connected to a user router corresponding to the sender and the user router corresponding to the sender is connected to a sender communication terminal, and
    wherein the edge router associated with the sink IP address is connected to a user router corresponding to the recipient and the user router corresponding to the recipient is connected to a recipient communication terminal.

12. The meter rate fees charging method according to claim 11, wherein the charging step comprises recognizing, by being notified of allowed senders, that a sender not identical to any of the allowed senders is prohibited from using the computer network.

13. The meter rate fees charging method according to claim 11, wherein the charging step comprises recognizing, by being notified of recipients with whom the sender is prohibited from using the computer network, that the sender is prohibited from using the computer network.

14. A meter rate fees charging apparatus for charging a meter rate sender and a recipient by amount of communication from said sender said recipient via a network offering Internet connection services, comprising:
    detecting means for detecting the personal information of said sender, including a source IP address, and personal information of the recipient, including a sink IP address, in transmission information transmitted and received via said network as part of the services;
    charging processing means for determining whether to charge the sender, the recipient or the sender and the recipient based on a classification of an edge router associated with the source IP address and an edge router associated with the sink IP address,
    wherein if the charging processing means determines to charge the sender, the charging processing means makes a charge of the meter rate fee to the sender based on the zone information and an amount of time for a flow of Internet communication reach the edge router associated with the source IP address from the edge router associated with the sink IP address.
    wherein the amount of the meter rate fee is calculated based on an amount of time spent for a flow of Internet communication to reach an edge router associated with the source IP address from an edge router associated with the sink IP address,
    wherein the edge router associated with the source IP address is connected to a user router corresponding to the sender and the user router corresponding to the sender is connected to a sender communication terminal, and
    wherein the edge router associated with the sink IP address is connected to a user router corresponding to the recipient and the user router corresponding to the recipient is connected to a recipient communication terminal.

15. The meter rate fees charging apparatus according to claim 14, wherein the charging processing means performs charging processing set for each of relationships between the recipient and the sender.

16. The meter rate fees charging apparatus according to claim 14, wherein the detecting means and the charging processing means are integrated into one.

17. A meter rate fees charging method for charging a meter rate sender and a recipient by amount of communication from said sender said recipient via a network offering Internet connection services, comprising:
    detecting the personal information of said sender, including a source IP address, and personal information of the recipient, including a sink IP address, in transmission information transmitted and received via said network as part of the services;
    detecting the recipient and the sender of the transmission information;

determining whether to charge the sender, the recipient or the sender and the recipient based on a classification of an edge router associated with the source IP address and an edge router associated with the sink IP address.

wherein if the charging determines to charge the sender, the charging makes a charge of the meter rate fee to the sender based on the zone information and an amount of time for a flow of Internet communication reach the edge router associated with the source IP address from the edge router associated with the sink IP address.

wherein the amount of the meter rate fee is calculated based on an amount of time spent for a flow of Internet communication to reach an edge router associated with the source IP address from an edge router associated with the sink IP address, wherein the edge router associated with the source IP address is connected to a user router corresponding to the sender and the user router corresponding to the sender is connected to a sender communication terminal, and wherein the edge router associated with the sink IP address is connected to a user router corresponding to the recipient and the user router corresponding to the recipient is connected to a recipient communication terminal.

18. The meter rate fees charging apparatus according to claim 1, wherein the charging processing means makes the charge to the sender further based on an amount of communication in the flow.

19. The meter rate fees charging method according to claim 18, wherein the amount of communication is a number of bytes.

* * * * *